(12) United States Patent
Tomosada et al.

(10) Patent No.: US 9,191,565 B2
(45) Date of Patent: Nov. 17, 2015

(54) LENS UNIT, IMAGE PICKUP APPARATUS, AND METHODS OF CONTROLLING LENS UNIT AND IMAGE PICKUP APPARATUS

(71) Applicant: CANON KABUSHIKI KAISHA, Tokyo (JP)

(72) Inventors: Toshihiko Tomosada, Kawasaki (JP); Shun Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 14/347,357

(22) PCT Filed: Dec. 28, 2012

(86) PCT No.: PCT/JP2012/084309
§ 371 (c)(1),
(2) Date: Mar. 26, 2014

(87) PCT Pub. No.: WO2013/105479
PCT Pub. Date: Jul. 18, 2013

(65) Prior Publication Data
US 2014/0218564 A1 Aug. 7, 2014

(30) Foreign Application Priority Data

Jan. 13, 2012 (JP) ................................. 2012-004545
Jan. 13, 2012 (JP) ................................. 2012-004765
Jun. 4, 2012 (JP) ................................. 2012-127066

(51) Int. Cl.
*H04N 5/232* (2006.01)
*G02B 27/42* (2006.01)
(Continued)

(52) U.S. Cl.
CPC .......... *H04N 5/23209* (2013.01); *G02B 27/646* (2013.01); *G03B 3/10* (2013.01);
(Continued)

(58) Field of Classification Search
CPC ........................ H04N 5/23209; H04N 5/23296
See application file for complete search history.

(56) References Cited

U.S. PATENT DOCUMENTS 5,786,853 A * 7/1998 Ohkawara et al. ......... 348/240.3
8,164,635 B2 4/2012 Watanabe
(Continued)

FOREIGN PATENT DOCUMENTS

| CN | 102016680 A | 4/2011 |
|---|---|---|
| CN | 102027409 A | 4/2011 |

(Continued)

OTHER PUBLICATIONS

Mar. 12, 2013 International Search Report and Written Opinion in International Patent Appln. No. PCT/JP2012/084309.
(Continued)

*Primary Examiner* — Paul Berardesca
(74) *Attorney, Agent, or Firm* — Fitzpatrick, Cella, Harper & Scinto

(57) ABSTRACT

A lens unit L100 is removably mounted on an image pickup apparatus generating control information used for a vibration control that vibrates a correction lens L105 and moves a vibration center of the correction lens L105, includes an image pickup optical system including a magnification varying lens L102 and the correction lens L105, a storage unit storing first information indicating a relation between positions of the magnification varying lens L102 and the correction lens L105, and a lens controller performing a predetermined control in which the correction lens L105 moves in accordance with the movement of the magnification varying lens L102, and the lens controller sends information relating to the magnification varying operation to the image pickup apparatus, and overlaps the vibration control of the correction lens L105 based on the control information in accordance with the information relating to the magnification varying operation with the predetermined control.

21 Claims, 20 Drawing Sheets

(51) Int. Cl.
　　　*G02B 7/10*　　　(2006.01)
　　　*G03B 17/14*　　(2006.01)
　　　*G03B 3/10*　　　(2006.01)
　　　*G02B 27/64*　　(2006.01)

(52) U.S. Cl.
　　　CPC ........... *G03B 17/14* (2013.01); *H04N 5/23212* (2013.01); *H04N 5/23296* (2013.01); *G02B 7/102* (2013.01); *G03B 2205/0007* (2013.01); *G03B 2205/0046* (2013.01); *G03B 2206/00* (2013.01)

(56) References Cited

U.S. PATENT DOCUMENTS

| | | | |
|---|---|---|---|
| 8,488,050 | B2 | 7/2013 | Ueda et al. |
| 8,542,989 | B2 | 9/2013 | Shibuno et al. |
| 8,724,012 | B2 | 5/2014 | Ueda et al. |
| 8,958,008 | B2 | 2/2015 | Kudo |
| 2004/0114251 | A1 | 6/2004 | Kaneda et al. |
| 2005/0046966 | A1* | 3/2005 | Okawara ............. 359/696 |
| 2005/0232618 | A1 | 10/2005 | Kaneda et al. |
| 2009/0040354 | A1 | 2/2009 | Takanashi |
| 2010/0178045 | A1* | 7/2010 | Hongu ............. 396/80 |
| 2010/0315519 | A1 | 12/2010 | Watanabe |
| 2011/0043678 | A1 | 2/2011 | Ueda et al. |
| 2011/0064397 | A1 | 3/2011 | Shibuno et al. |
| 2011/0122310 | A1 | 5/2011 | Kudo |
| 2013/0070124 | A1* | 3/2013 | Katsuyama et al. ....... 348/240.3 |
| 2013/0271644 | A1 | 10/2013 | Ueda et al. |

FOREIGN PATENT DOCUMENTS

| | | |
|---|---|---|
| CN | 102137233 A | 7/2011 |
| JP | 01-307710 A | 12/1989 |
| JP | 09-009131 A | 1/1997 |
| JP | 2795439 B2 | 9/1998 |
| JP | 2002-131797 A | 5/2002 |
| JP | 2004-144802 A | 5/2004 |
| JP | 3943609 B2 | 7/2007 |
| JP | 2008-051871 A | 3/2008 |
| JP | 2009-278308 A | 11/2009 |
| JP | 2010-288236 A | 12/2010 |
| WO | 2009/139192 A1 | 11/2009 |

OTHER PUBLICATIONS

Sep. 1, 2015 Chinese Official Action in Chinese Patent Appln. No. 201280067037.5.

* cited by examiner

LENS UNIT, IMAGE PICKUP APPARATUS, AND METHODS OF CONTROLLING LENS UNIT AND IMAGE PICKUP APPARATUS

TECHNICAL FIELD

The present invention relates to an image pickup apparatus capable of exchanging a lens unit.

BACKGROUND ART

In an autofocus (AF) control in a lens interchangeable type image pickup apparatus, as disclosed in Patent Literature 1 (PTL 1), a focus signal that indicates a contrast state of an image (a focus state of an image pickup optical system) is generated at a camera body side. Then, commonly, a correction lens (a focus lens) is moved based on the focus signal obtained from the camera body so as to perform the AF control. In this case, the focus signal according to characteristics of amounted lens unit is generated at the camera body side, and the AF control is performed at the lens unit side. Therefore, the accuracy of the focusing by the AF control is determined in accordance with the combination of the camera body and the lens unit.

On the other hand, recently, the performance of an image pickup element such as a CMOS sensor at the camera body side is dramatically improved, and the high accuracy is also required for the focusing according to this. In this case, it is preferred that the AF control be performed according to the performance of the image pickup element at the camera body side and that the correction lens be moved in accordance with a control signal supplied from the camera body at the lens unit.

CITATION LIST

Patent Literature

[PTL 1] Japanese Patent No. 3943609

SUMMARY OF INVENTION

Technical Problem

In many image pickup apparatuses, when a varying the magnification of the image pickup optical system can be performed, a zoom tracking control that corrects an image plane variation caused by varying the magnification is performed. In order to perform this zoom tracking control by the lens interchangeable image pickup apparatus, it is necessary to store data unique to the lens unit such as zoom tracking data indicating a position relation between a magnification varying lens and the correction lens that are used for the zoom tracking control in the camera body. However, it is difficult to store data unique to various kinds of lens units in the camera body.

The present invention is capable of a good zoom tracking control even when each of various kinds of lens units is mounted on an image pickup apparatus.

Solution to Problem

A lens unit as one aspect of the present invention is capable of being removably mounted on an image pickup apparatus including an image pickup element configured to perform photoelectric conversion of an object image formed by an image pickup optical system, a focus signal generator configured to generate a focus signal indicating a focus state of the image pickup optical system using an output from the image pickup element, and an image pickup apparatus controller configured to generate control information used for a vibration control that vibrates a correction lens and also moves a vibration center of the correction lens in a direction where the focus signal increases, and the lens unit includes an image pickup optical system including a magnification varying lens configured to perform a magnification varying operation and the correction lens configured to correct an image plane variation caused by a movement of the magnification varying lens, a storage unit storing first information that indicates a relation between a position of the magnification varying lens and a position of the correction lens for each object distance, and a lens controller configured to control a communication with the image pickup apparatus and perform a predetermined control in which the correction lens moves in accordance with the movement of the magnification varying lens based on the first information, and the lens controller sends information relating to the magnification varying operation to the image pickup apparatus, and overlaps the vibration control of the correction lens based on the control information generated by the image pickup apparatus in accordance with the information relating to the magnification varying operation with the predetermined control.

An image pickup apparatus as another aspect of the present invention is an image pickup apparatus on which a lens unit is capable of being removably mounted, and the lens unit includes an image pickup optical system including a magnification varying lens configured to perform a magnification varying operation and a correction lens configured to correct an image plane variation caused by a movement of the magnification varying lens, a storage unit storing first information that indicates a relation between a position of the magnification varying lens and a position of the correction lens for each object distance, and a lens controller configured to perform a predetermined control in which the correction lens moves in accordance with the movement of the magnification varying lens based on the first information, and the image pickup apparatus includes an image pickup element configured to perform photoelectric conversion of an object image formed by the image pickup optical system, a focus signal generator configured to generate a focus signal indicating a focus state of the image pickup optical system using an output from the image pickup element, and an image pickup apparatus controller configured to control a communication with the lens unit and generate control information used for a vibration control that vibrates the correction lens and also moves a vibration center of the correction lens in a direction where the focus signal increases, and the image pickup apparatus controller receives information relating to a magnification varying operation, generates the control information in accordance with the information relating to the magnification varying operation, and sends the control information to the lens unit.

A method of controlling the lens unit as another aspect of the present invention includes the steps of sending information relating to the magnification varying operation to the image pickup apparatus, receiving the control information generated in accordance with the information relating to the magnification varying operation from the image pickup apparatus, and overlapping the vibration control of the correction lens based on the control information with the predetermined control.

A method of controlling the image pickup apparatus as another aspect of the present invention includes the steps of generating a focus signal indicating a focus state of the image pickup optical system using an output from an image pickup element that performs photoelectric conversion of an object image formed by the image pickup optical system, receiving information relating to the magnification varying operation from the lens unit, generating control information used for vibration control that vibrates the correction lens and also moves a vibration center of the correction lens in a direction where the focus signal increases in accordance with the information relating to the magnification varying operation, and sending the generated control information to the lens unit. Further features and aspects of the present invention will become apparent from the following description of exemplary embodiments with reference to the attached drawings.

Advantageous Effects of Invention

According to the present invention, a good zoom tracking control can be performed even when each of various kinds of lens units is mounted on an image pickup apparatus.

DESCRIPTION OF EMBODIMENTS

Figure 1:
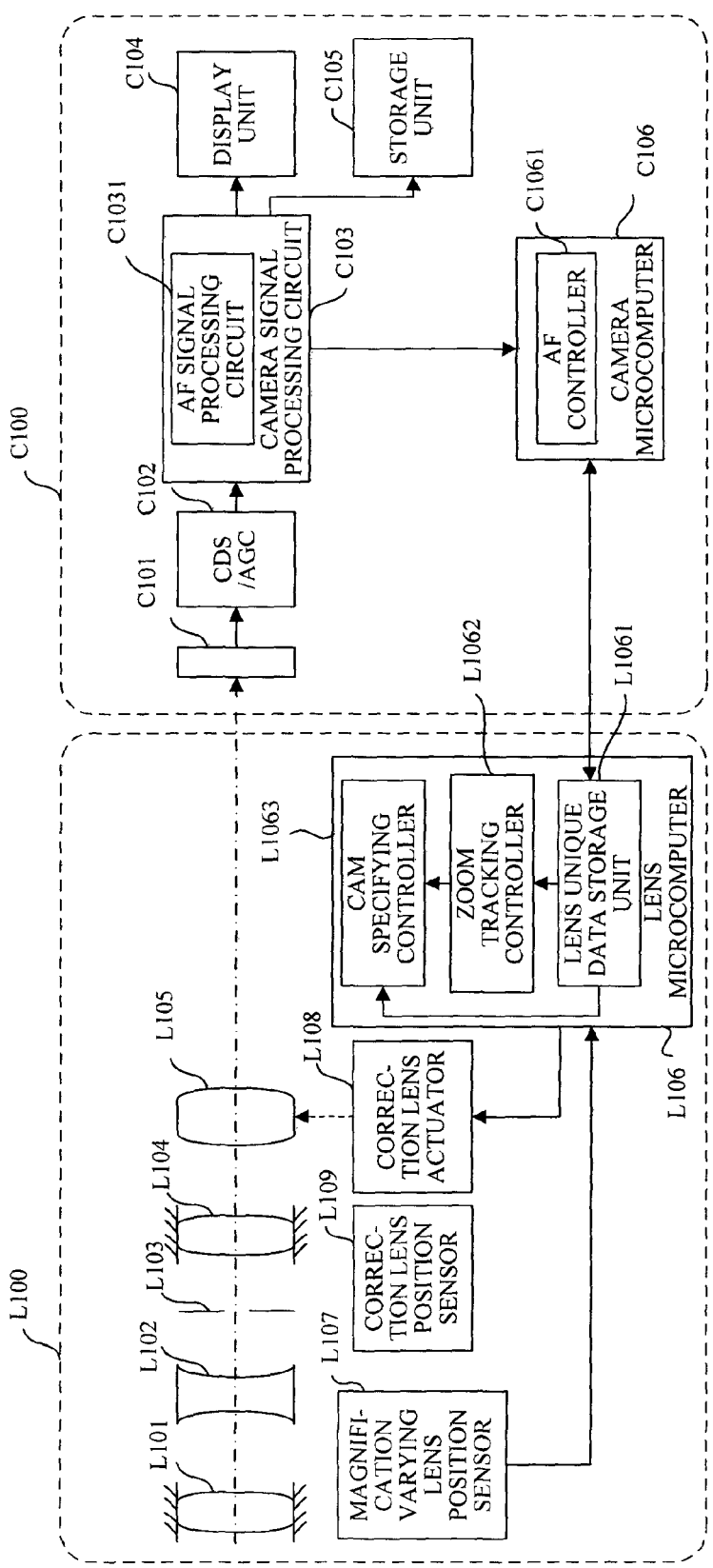
FIG. 1 is a block diagram of illustrating a configuration of a camera system with an interchangeable lens in Embodiment 1.

Exemplary embodiments of the present invention will be described below with reference to the accompanied drawings. In each of the drawings, the same elements will be denoted by the same reference numerals and the duplicate descriptions thereof will be omitted.

EXAMPLE 1

First of all, referring to FIG. 1, a camera system with an interchangeable lens in Embodiment 1 (Example 1) of the present invention will be described. FIG. 1 is a block diagram of illustrating a configuration of the camera system with the interchangeable lens in the present embodiment. In the camera system of the present embodiment, control information used to perform a modulation AF control described below (hereinafter, referred to as modulation AF control information) is sent from a camera body that is an image pickup apparatus to a lens unit. On the other hand, the lens unit calculates a driving amount of a correction lens based on data unique to the lens unit such as a zoom tracking cam as zoom tracking data and the modulation AF control information obtained from the camera body in accordance with the movement of a magnification varying lens. Then, the driving amount of the modulation AF control is overlapped with the moving amount of the zoom tracking control, i.e. a zoom tracking control is performed by overlapping the modulation AF control, and the correction lens is moved while specifying the zoom tracking cam that is to be traced. As a result, an image plane variation caused by varying the magnification is corrected and the magnification variation is performed while an in-focus state is maintained.

In FIG. 1, an interchangeable lens L100 (a lens unit) is removably mounted on a camera body C100. Light from an object passes through an image pickup optical system in the interchangeable lens L100, and forms an object image on an image pickup element C101 in the camera body C100. The image pickup optical system, in order from an object side, includes a first fixed lens unit L101 that is fixed, a magnification varying lens L102 that moves in an optical axis direction so as to varying the magnification, a stop L103 that adjusts a light amount, and a second fixed lens unit L104 that is fixed. The magnification varying lens L102 moves in accordance with an operation of a rotatable zoom ring that is provided in an outer circumference of the interchangeable lens L100. In addition, the image pickup optical system includes a correction lens (a focus lens) L105 that has both a function of correcting the image plane variation caused by varying the magnification and a focusing function. Thus, the image pickup optical system is configured by including the magnification varying lens L102 and the correction lens L105 that moves in order to correct the image plane variation caused by the movement of the magnification varying lens L102. In FIG. 1, each lens unit is depicted so as to be configured by one lens, but practically, it may be configured by one lens or alternatively may be configured by a plurality of lenses.

On the other hand, in the camera body C100, the image pickup element C101 is a photoelectric conversion element that is configured by a CCD sensor or a CMOS sensor, which performs a photoelectric conversion for the object image so as to output an analog signal. The image pickup element C101 may also be provided for each of three primary colors of red (R), green (G), and blue (B).

A CDS/AGC/AD converter C102 samples the output of the image pickup element C101 and also performs a gain adjustment and a digital conversion. The camera signal processing circuit C103 performs various kinds of image processings for an output signal from the CDS/AGC/AD converter C102 so as to generate an image signal. Reference numeral C1031 in the camera signal processing circuit C103 is an AF signal processing circuit. The AF signal processing circuit C1031 extracts a high-frequency component (a high-frequency signal), a luminance difference component, and the like, that are generated from the high-frequency signal based on an output signal from a pixel of a region used for focus detection of output signals of all pixels of the image pickup element C101 from the CDS/AGC/AD converter C102 so as to generate a focus signal. The focus signal is also called a contrast evaluation value signal, which indicates sharpness (a contrast state) of an image that is generated based on the output signal from the image pickup element C101. Since the sharpness changes in accordance with a focal state of the image pickup optical system, as a result, the focus signal is a signal that indicates the focal state of the image pickup optical system. The AF signal processing circuit C1031 corresponds to a focus signal generating unit (a focus signal generator).

A display unit C104 displays the image signal from the camera signal processing circuit C103. A storage unit C105 stores the image signal from the camera signal processing circuit C103 in a storage medium such as a magnetic tape, an optical disc, or a semiconductor memory. A camera microcomputer C106 outputs the modulation AF control information for a lens microcomputer L106 in the interchangeable lens L100 based on the output of the camera signal processing circuit C103.

The modulation AF control is a vibration control that slightly vibrates the correction lens L105 in a direction of increasing or decreasing the focus signal, i.e. a value of the focus signal (in a close distance direction or in an infinitely far direction) so as to move a vibration center of the correction lens L105 in the direction of increasing the focus signal, i.e. the value of the focus signal. The details of the modulation AF control will be described below. The modulation AF control information is information used for the modulation AF control, which contains information of an operation step indicating a moving direction of the minute vibration (hereinafter, referred to as a modulation operation step), the presence or absence of the movement of the center of the vibration, its moving direction (at an infinitely far side or at a close distance side), a moving timing of the correction lens L105, or the like. The details of the modulation operation step will be described below.

The modulation AF control information only needs to contain at least one of the modulation operation step (the way of the movement of the correction lens L105), the presence or absence of the movement of the center of the vibration, its moving direction, and the moving timing, and other information may also be contained. In the present embodiment, in addition, information which indicates whether the switching to the modulation AF control corresponding to the zoom control has been performed in accordance with the magnification varying operation (the zooming), i.e. in accordance with an output of a magnification varying lens position sensor L107, and the in-focus degree of the object calculated based on the focus signal are sent. The output of the modulation AF control information is mainly performed by an AF controller C1061 in the camera microcomputer C106. The details of the operation of the AF controller C1061 will be described below.

The lens microcomputer L106 can mutually send and receive the information to and from the camera microcomputer C106, which receives the modulation AF control information from the camera microcomputer C106. The lens microcomputer L106 calculates a target drive position of the correction lens L105 based on the modulation AF control information and the data unique to the lens unit described below, and controls a correction lens actuator L108 so as to move the correction lens L105 to the target drive position. Thus, the correction of the image plane variation caused by varying the magnification or the focusing is performed.

A lens unique data storage unit L1061 in the lens microcomputer L106 stores the data unique to the lens unit. As the data unique to the lens unit, specifically, there are data of a plurality of zoom tracking cams that indicate the relation between a position of the magnification varying lens L102 and an in-focus position of the correction lens L105 for each object distance, data of a control resolution of the correction lens actuator L108, or the like.

A zoom tracking controller L1062 in the lens microcomputer L106 controls the movement of the correction lens L105 via the correction lens actuator L108 in accordance with the movement of the magnification varying lens L102, based on the zoom tracking cam that is stored in the lens unique data storage unit L1061. Thus, in order to correct the image plane variation caused by the movement of the magnification varying lens L102, a zoom tracking control that moves the correction lens L105 is performed.

A cam specifying controller L1063 in the lens microcomputer L106 performs a cam specifying control. Specifically, the cam specifying controller L1063 overlaps a modulation control amount that is calculated based on the data unique to the lens unit and the modulation AF control information received from the AF controller C1061 with the moving amount (a correction amount) of the correction lens L105 by the zoom tracking controller L1062. Thus, the cam specifying controller L1063 controls the correction lens actuator L108 by calculating the target drive position of the correction lens L105, and performs a control to specify a zoom tracking cam that is to be followed (reference data).

The magnification varying lens position sensor L107 detects a position of the magnification varying lens L102. A correction lens position sensor L109 detects a position of the correction lens L105. The lens microcomputer L106 obtains an in-focus position of the correction lens L105 corresponding to the position of the magnification varying lens L102 detected via the magnification varying lens position sensor L107, from the data of the zoom tracking cam. The lens microcomputer L106 changes the modulation control amount that is overlapped with the correction amount of the correction lens L105 in accordance with the detected position of the magnification varying lens L102.

In addition, the lens microcomputer L106 as a magnification varying detector determines whether the magnification varying lens L102 is in the magnification varying operation based on the change of the output of the magnification varying lens position sensor L107, and sends zoom information to the camera microcomputer C106. On receiving this zoom information, the camera microcomputer C106 switches the control to the modulation AF control corresponding to the zoom control when it is in the magnification varying operation, and sends information indicating that the control has been switched, to the lens microcomputer L106.

The correction lens actuator L108 is configured by an actuator such as a stepping motor, a DC motor, a vibration motor, a voice coil motor, and the like.

Next, referring to FIGS. 2 to 15, the zoom tracking control and the cam specifying control that are performed by the lens microcomputer L106 and the camera microcomputer C106 will be described.

First of all, referring to FIGS. 2 to 5, the zoom tracking control will be described. The zoom tracking control is performed by the lens microcomputer L106 in accordance with a computer program.

Figure 2:
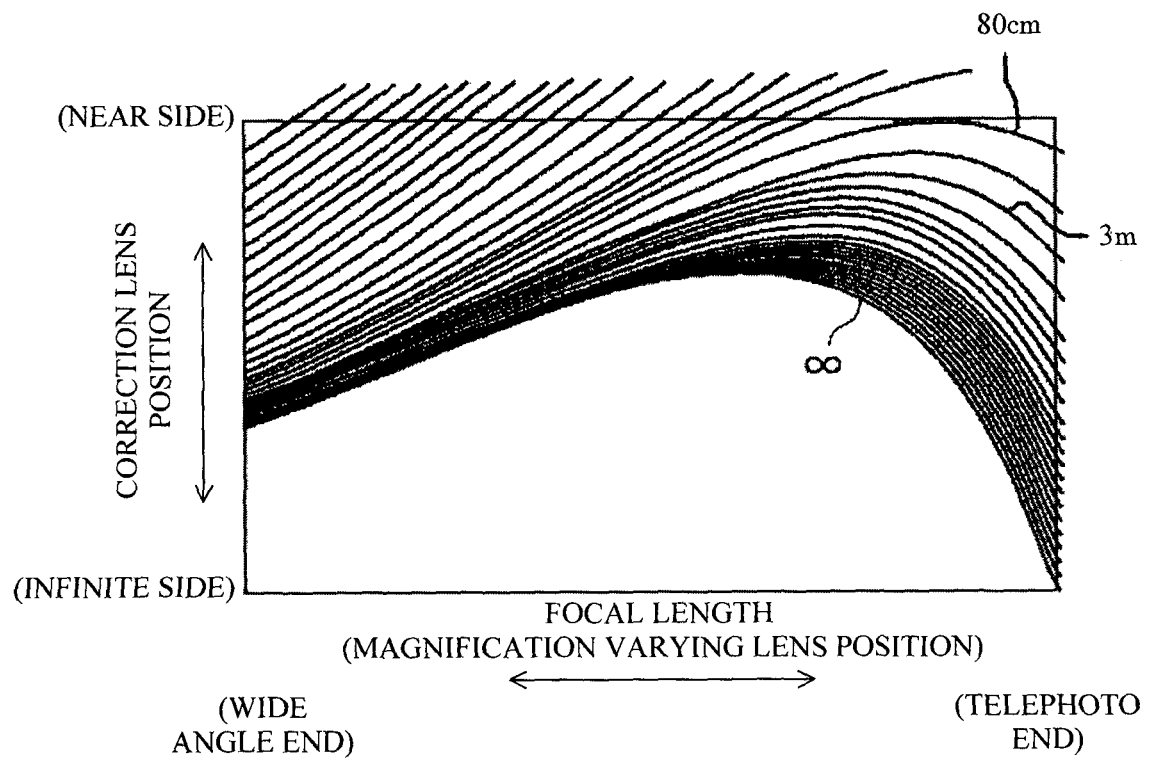
FIG. 2 is an example of zoom tracking cam data in Embodiment 1.

FIG. 2 is one example of a plurality of zoom tracking cams that indicate the relation between the position of the magnification varying lens L102 and the in-focus position of the correction lens L105 for each object distance. In the zoom tracking control, a zoom tracking cam depending on the object distance is selected from among the plurality of zoom tracking cams. Then, the correction lens L105 is moved to the in-focus position corresponding to the position of the magnification varying lens on the selected zoom tracking cam, and therefore the magnification varying operation can be performed while the in-focus state is maintained.

Figure 3:
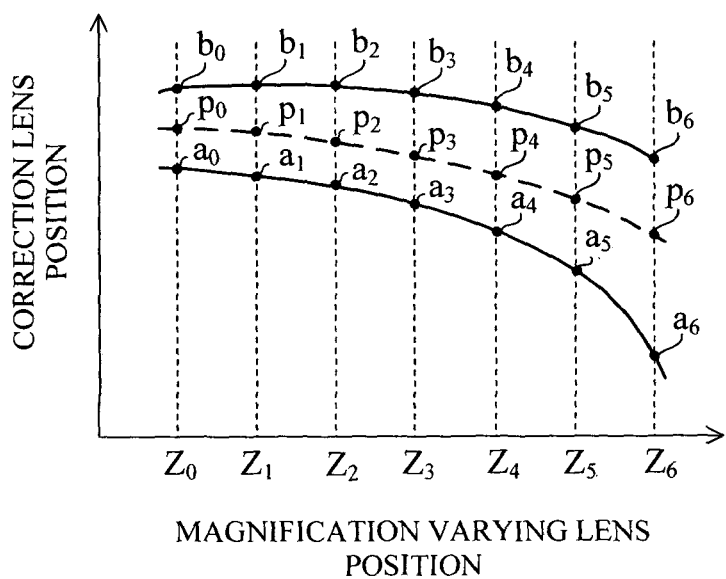
FIG. 3 is a diagram of describing the zoom tracking cam data in Embodiment 1.

FIG. 3 is a diagram of describing a tracking method of the zoom tracking cam of the correction lens in the image pickup optical system of inner focus type such as the lens unit L100 of the present embodiment. In FIG. 3, symbol $Z_0, Z_1, Z_2, \ldots, Z_6$ denote positions of the magnification varying lens L102. Symbol $a_0, a_1, a_2, \ldots, a_6$ and $b_0, b_1, b_2, \ldots, b_6$ denote groups of the in-focus positions of the correction lens L105 for each object distance that are previously stored in the lens unique data storage unit L1061 in the camera microcomputer C106. Each of the groups $(a_0, a_1, a_2, \ldots, a_6)$ and $(b_0, b_1, b_2, \ldots, b_6)$ of the in-focus positions of the correction lens L105 is the zoom tracking cam for each representative object distance (hereinafter, referred to as a representative cam).

Symbol $p_0, p_1, p_2, \ldots, p_6$ denote positions on the zoom tracking cam where the correction lens L105 is actually to be followed, which is calculated based on two representative cams corresponding to two object distance when an actual object distance is between two representative object distance. A calculating formula of the position on this zoom tracking cam is represented as the following Expression (1).

$$P_{(n+1)} = |p_{(n)} - a_{(n)}| / |b_{(n)} - a_{(n)}| \times |b_{(n+1)} - a_{(n+1)}| + a_{(n+1)} \quad (1)$$

Referring to Expression (1), for example in FIG. 3, when the correction lens L105 is located at $p_0$, a ratio of internally dividing a line segment $b_0$–$a_0$ by $p_0$ is obtained and a point at which a line segment $b_1$–$a_1$ is internally divided in accordance with this ratio is set to $p_1$. Then, a moving speed of the correction lens L105 to maintain the in-focus state can be calculated based on a position difference of $p_1$-$p_0$ and a time required for the magnification varying lens L102 to move from $Z_0$ to $Z_1$.

Figures 4, 5:
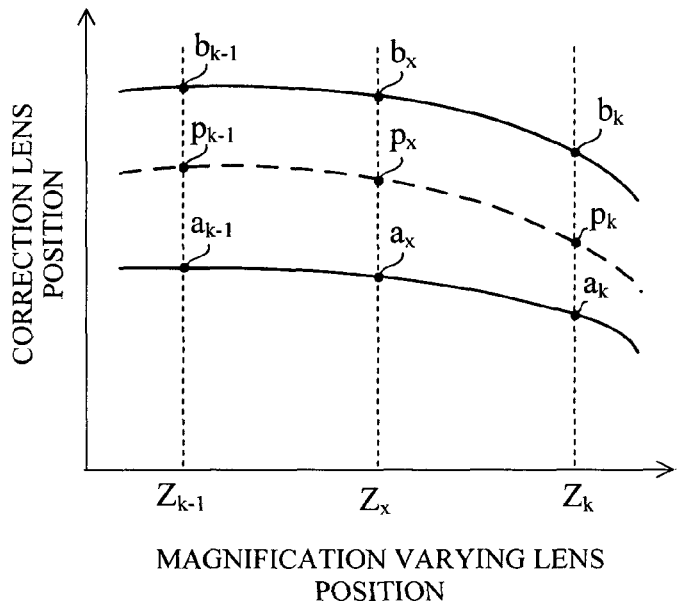
FIG. 4 is a diagram of describing an interpolation method of a magnification varying lens in a moving direction in Embodiment 1.
FIG. 5 is an example of a zoom tracking cam data table in Embodiment 1.

Next, a case where there is no limitation that a stop position of the magnification varying lens L102 is only on a boundary of a magnification varying area having the stored representative cam will be described. FIG. 4 is a diagram describing an interpolation method of the magnification varying lens in the moving direction, which is a diagram of extracting a part of FIG. 3 and arbitrarily setting the magnification varying lens position. In FIG. 4, a vertical axis indicates the position of the correction lens L105 and a lateral axis indicates the position of the magnification varying lens L102. In addition, in FIG. 4, when the positions of the magnification varying lens L102 are set to $Z_{k-1}, Z_k, Z_x$, the positions of the correction lens L105 on the representative cam stored in the camera microcomputer C106 are defined as $a_{k-1}, a_x, a_k$ and $b_{k-1}, b_x, b_k$ for each object distance.

When the position of the magnification varying lens L102 is located at $Z_x$ that is not on the boundary of the magnification varying area and the position of the correction lens L105 is located at $p_x$, the positions $a_x, b_x$ of the correction lens L105 are obtained as represented by the following Expressions (2) and (3), respectively.

$$a_x = a_k - (Z_k - Z_x) \times (a_k - a_{k-1}) / (Z_k - Z_{k-1}) \quad (2)$$

$$b_x = b_k - (Z_k - Z_x) \times (b_k - b_{k-1}) / (Z_k - Z_{k-1}) \quad (3)$$

In other words, using the internal ratio that is obtained from the current position of the magnification varying lens L102 and the two boundary positions (for example, $Z_k$ and $Z_{k-1}$ in FIG. 4) of the two magnification varying area at both sides of the current position of the magnification varying lens L102, in-focus positions having the same object distance of the in-pocus positions $(a_k, a_{k-1}, b_k, b_{k-1})$ on the four stored representative cams are internally divided. As a result, the positions $a_x, b_x$ of the correction lens L105 can be obtained. In addition, using the internal ratio obtained from $a_x, p_x, b_x$, the in-focus positions having the same focal length of the in-focus positions on the four representative cams are internally divided as represented by Expression (1), and therefore $p_k$ and $p_{k-1}$ can be obtained.

When varying the magnification from a wide (a wide-angle) side to a tele (telephoto) side, the moving speed of the correction lens L105 that is required to maintain the in-focus state based on a difference between the target position $p_k$ of the correction lens L105 that is to be moved and the current position $p_x$ of the correction lens L105, and a time required for the magnification varying lens L102 to move from $Z_x$ to $Z_k$.

On the other hand, when varying the magnification from the telephoto side to the wide-angle side, the moving speed of the correction lens L105 that is required to maintain the in-focus state based on a difference between the target position $p_{k-1}$ of the correction lens L105 that is to be moved and the current position $p_x$ of the correction lens L105, and a time required for the magnification varying lens L102 to move from $Z_x$ to $Z_{k-1}$.

FIG. 5 is one example of table data of the representative cams that are previously stored in the camera microcomputer C106. In this drawing, a correction lens position $A_{(n,v)}$ for each object distance which changes in accordance with the position of the magnification varying lens L102 is illustrated. The object distance indicated by a variable n changes in a lateral direction, and the position of the magnification varying lens L102 indicated by a variable v changes in a vertical direction. When the variable n is equal to zero (n=0), the object distance is the infinite object distance, and the object distance changes to the closest distance side as the variable n is enlarged. When n is equal to m, the object distance is 1 cm.

On the other hand, v=0 indicates a wide-angle end, and the focal length increases as the variable v is enlarged, and v=s indicates a tele end (a telephoto end). Accordingly, one representative cam is depicted by one (vertical) column table data.

Thus, one or two representative cams depending on the object distance are selected from among the plurality of representative cams during varying the magnification, and the correction lens L105 is moved in accordance with the one selected representative cam or in accordance with the actual zoom tracking cam calculated by the above method from these two representative cams. As a result, the magnification varying operation can be performed while the in-focus state is maintained.

In this case, when the magnification varying lens L102 moves from a telephoto direction to a wide-angle direction, the zoom tracking cam that is to be followed can be easily specified since the plurality of representative cams are separated at intervals to some extent at the telephoto side. However, when the magnification varying lens L102 moves from the wide-angle direction to the telephoto direction, it is difficult to specify the zoom tracking cam that is to be followed since the plurality of representative cams are close to each other at the wide-angle side. Therefore, a cam specifying control described below is performed.

Figure 6A:
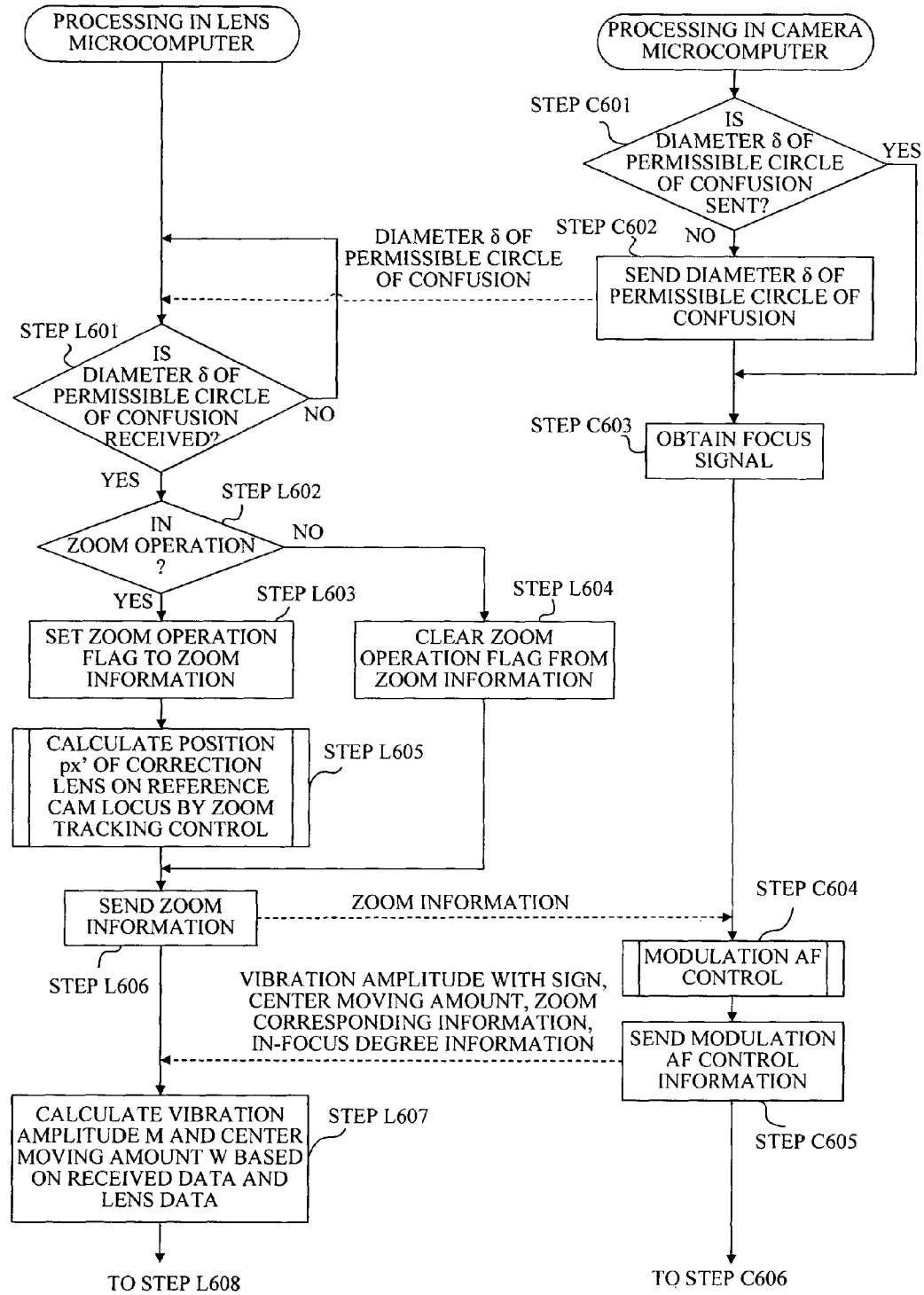
FIG. 6A is a flowchart of illustrating a control in Embodiment 1.
Figure 6B:
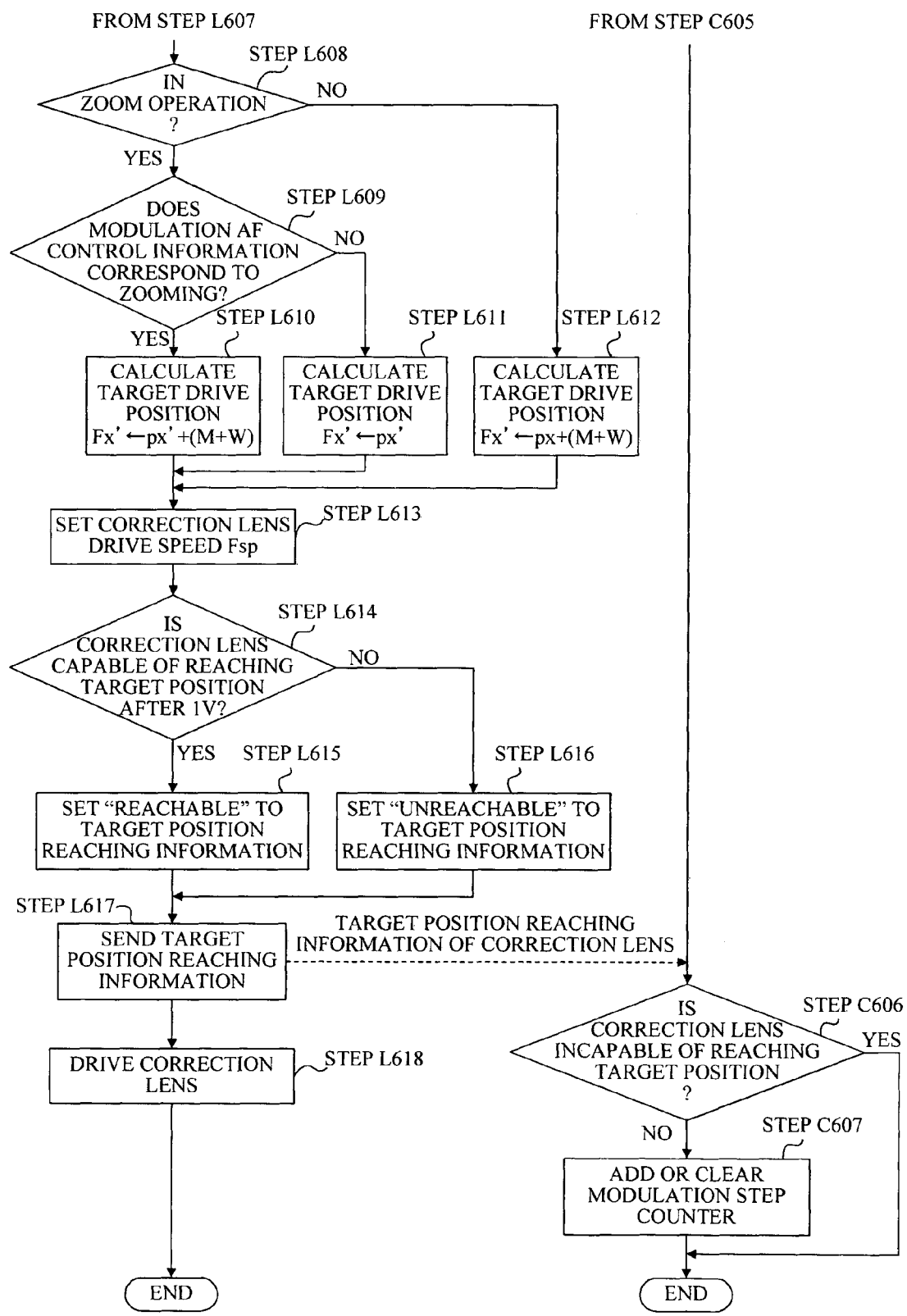
FIG. 6B is a flowchart of illustrating a control in Embodiment 1.

In flowcharts of FIGS. 6A and 6B, a procedure of the cam specifying control that is performed by the lens microcomputer L106 (mainly the cam specifying controller L1063) and the camera microcomputer C106 (mainly, the AF controller C1061) is illustrated. The cam specifying control is performed by the lens microcomputer L106 and the camera microcomputer C106 in accordance with a computer program.

First of all, in Step L601, the lens microcomputer L106 determines whether information of a diameter δ of a permissible circle of confusion described below is received from the camera microcomputer C106. The information of the diameter δ of the permissible circle of confusion is used to calculate the moving amount of the correction lens L105 in the vibration control. The information of the diameter δ of the permissible circle of confusion is sent from the camera microcomputer C106 to the lens microcomputer L106 by an initial communication that is performed in applying the power. In Step L601, the information of the diameter δ of the permissible circle of confusion has been already received, the flow proceeds to Step L602.

On the other hand, in Step C601, the camera microcomputer C106 determines whether the information of the diameter δ of the permissible circle of confusion has been sent to the lens microcomputer L106. When the information of the diameter δ of the permissible circle of confusion is sent in Step C602 when it has not been sent yet, and on the other hand, the flow proceeds to Step C603 when this information has been sent. The information of the diameter δ of the permissible circle of confusion is determined by a size of one pixel (a pixel pitch) that is determined based on a size and a pixel number of the image pickup element C101. A depth of focus is determined based on the information of the diameter δ of the permissible circle of confusion and an F-number of the image pickup optical system that is determined by a stop value of the step 103 in the lens unit L100. In the present embodiment, the information of the diameter δ of the permissible circle of confusion is sent only in the initial communication, but it may also be sent in every communication so as to change the size of the permissible circle of confusion in accordance with an image pickup mode or the like.

Subsequently, in Step L602, the lens microcomputer L106 as a magnification varying operation detector determines whether the magnification varying lens L102 is in the zoom operation based on the change of the output of the magnification varying lens position sensor L107. When it is in the zoom operation, the flow proceeds to Step L603. On the other hand, when it is not in the zoom operation, the flow proceeds to Step L604. In Step L603, a flag indicating that it is in the zoom operation is set as zoom information, and then the flow proceeds to Step L605. In Step L604, the flag indicating that it is in the zoom operation is cleared, and then the flow proceeds to Step L606.

In Step L605, the lens microcomputer L106 calculates a position px' of the correction lens L105 on the zoom tracking cam which is currently followed (hereinafter, referred to as a reference cam). Hereinafter, referring to FIGS. 7 to 10, a method of calculating the position px' of the correction lens L105 will be described in detail.

Figure 7:
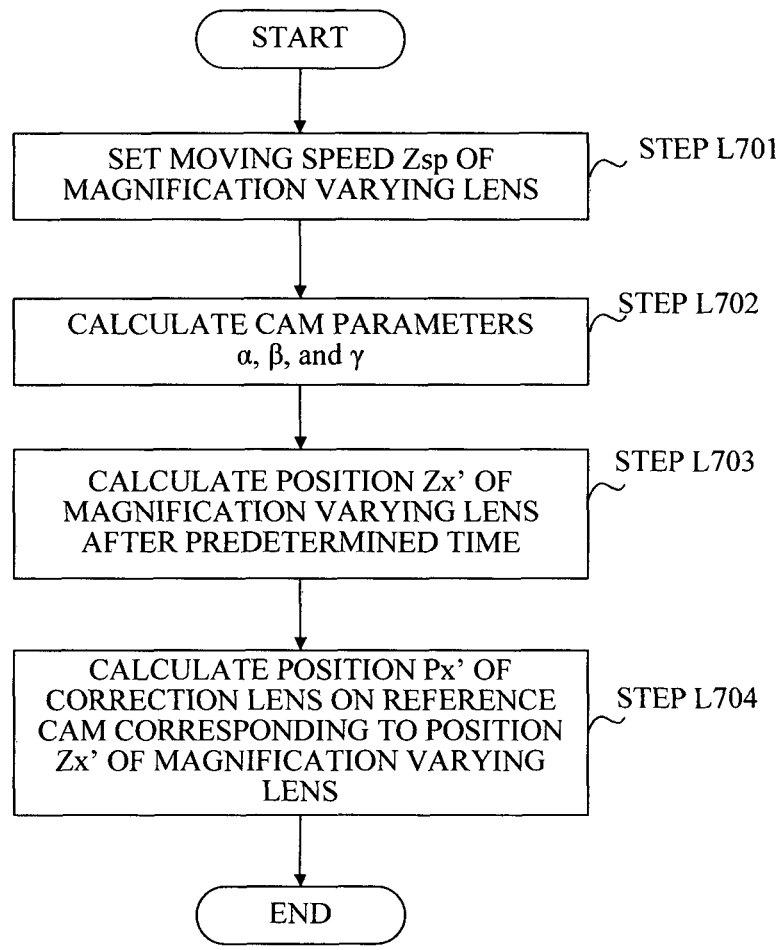
FIG. 7 is a flowchart of illustrating a zoom tracking control in Embodiment 1.

In a flowchart of FIG. 7, a series of processings of the zoom tracking control that is performed by the lens microcomputer L106 is illustrated.

In Step L701, the lens microcomputer L106 sets a moving speed Zsp of the magnification varying lens L102, and then the flow proceeds to Step L702. In the present embodiment, the magnification varying operation is performed by a manual zooming using a zoom ring and a cam ring that rotates by transferring the rotation of this zoom ring so as to move the magnification varying lens L102 in the optical axis direction. Therefore, in the present embodiment, the moving speed Zsp of the magnification varying lens L102 is calculated based on the moving amount per unit time in accordance with the output of the magnification varying lens position sensor L107. Thus, the lens unit L100 includes the zoom ring that rotates around the optical axis of the image pickup optical system and the magnification varying lens position sensor L107 that detects a change amount caused by the rotation of the zoom ring. The lens microcomputer L106 as the magnification varying operation detector detects the magnification varying operation based on the change of the output of the magnification varying lens position sensor L107. However, the present embodiment is not limited to this, and the moving speed Zsp of the magnification varying lens may also be calculated using an output of an acceleration sensor (not shown) provided on the zoom ring or the cam ring.

In Step L702, the lens microcomputer L106 specifies (estimates) a distance (an object distance) to the object that is to be taken from the current positions of the magnification varying lens and the correction lens. Then, it stores the object distance information as three cam parameters (data to obtain target position information) α, β, γ in a memory region (not shown) such as a RAM. Specifically, the lens microcomputer L106 performs a processing that is illustrated in a flowchart of FIG. 8. In the descriptions related to FIG. 8, it is assumed that the in-focus state is maintained at the current lens position.

Figure 8:
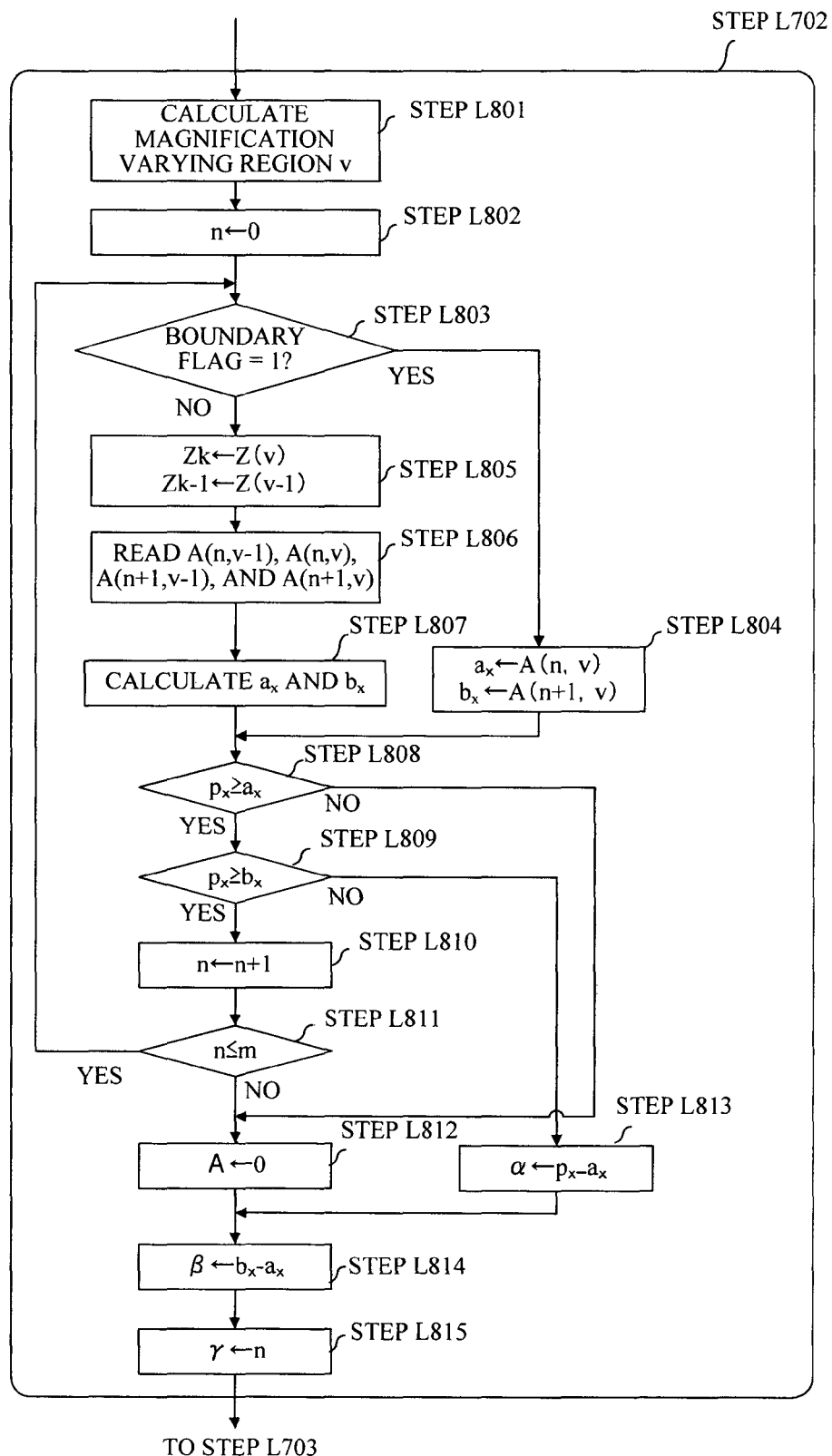
FIG. 8 is a flowchart of illustrating a processing of calculating a zoom tracking cam parameter in the zoom tracking control of Embodiment 1.

In Step L801 of FIG. 8, the lens microcomputer L106 calculates what number of the magnification varying area v of equally dividing by s from the wide end to the tele end does the position $Z_x$ of the current magnification varying lens L102 by the output of the magnification varying lens position sensor L107 exist on the data table illustrated in FIG. 5. Referring to a flowchart of FIG. 9, the calculation method will be described.

Figure 9:
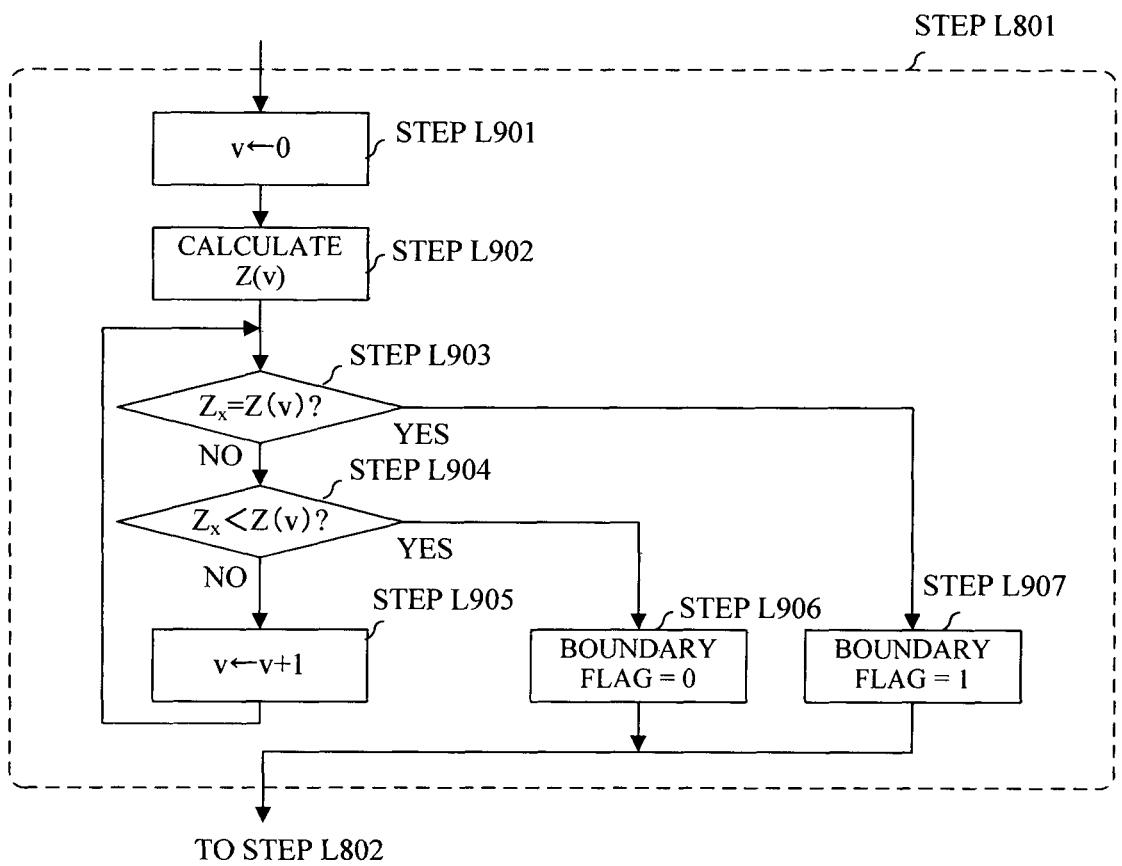
FIG. 9 is a flowchart of illustrating a processing of calculating a magnification varying area in Embodiment 1.

In Step L901 of FIG. 9, the lens microcomputer L106 clears the magnification varying area variable v. In Step L902, the lens microcomputer L106 calculates a position Z(v) of the magnification varying lens L102 on the boundary of the magnification varying area v in accordance with the following Expression (4). Symbol Z(v) corresponds to the positions $Z_0$, $Z_1$, $Z_2$, ... of the magnification varying lens L102 illustrated in FIG. 3.

$$Z(v) = \text{(a position of the magnification varying lens at the telephoto end} - \text{a position of the magnification varying lens at the wide-angle end)} \times v/s + \text{the position of the magnification varying lens at the wide-angle end} \quad (4)$$

In Step L903, the lens microcomputer L106 determines whether Z(v) obtained in Step L902 is equal to the position $Z_x$ of the current magnification varying lens L102. When these values are equal to each other, the position $Z_x$ of the magnification varying lens L102 is considered to be located on the boundary of the magnification varying area v, and then in Step L907, 1 is set as the boundary flag.

On the other hand, in Step L903, when Z(v) is not equal to the position $Z_x$ of the current magnification varying lens L102, the lens microcomputer L106 determines whether $Z_x<Z(v)$ is met in Step L904. When $Z_x<Z(v)$ is met (when the reply is YES), $Z_x$ is considered to be located between Z(v−1) and Z(v), and the boundary flag is set to zero in Step L906. On the other hand, when $Z_x<Z(v)$ is not met (the reply is NO), the lens microcomputer L106 increments the magnification varying area v in Step L905, and then the flow returns to Step L903.

Repeating the above processings, when the processings of FIG. 9 is finished, the current magnification varying lens position $Z_x$ exists in the magnification varying area of v=k (k number) on the data table of FIG. 5, and furthermore whether $Z_x$ is located on the magnification varying area boundary can be known.

In Step L801 of FIG. 8, when the current magnification varying area is calculated by the processing of FIG. 9, the lens microcomputer L106 calculates the position of the correction lens L105 (the position on the data table of FIG. 5) by the following processing.

Subsequently, in Step L802, the lens microcomputer L106 clears the object distance variable n, and in Step L803, it determines whether the current magnification varying lens position exists on the boundary of the magnification varying area. When the boundary flag is equal to zero, the current magnification varying lens position does not exist on the boundary, and then the flow proceeds to Step L805.

In Step L805, the lens microcomputer L106 set Z(v) in $Z_k$, and Z(v−1) is set in $Z_{k-1}$. Next, in Step L806, the lens microcomputer L106 reads four table data A(n,v−1), A(n,v), A(n+1,v−1), and A(n+1,v). Then, in Step L807, the values of $a_x$ and $b_x$ are calculated from the Expressions (2) and (3) described above, respectively.

On the other hand, when the boundary flag is determined to be 1 in Step L803, the lens microcomputer L106 proceeds to Step L804. In Step L804, the lens microcomputer L106 reads the in-focus position A(n,v) for the position (v in the embodiment) of the magnification varying lens L102 at the object distance n and the position A (n+1, v) for the position of the magnification varying lens L102 at the object distance n+1, and the read values are stored as $a_x$ and $b_x$, respectively.

In Step L808, the lens microcomputer L106 determines whether the current position $p_x$ of the correction lens L105 is not less than $a_x$. When the current position $p_x$ of the correction lens L105 is not less than $a_x$, the lens microcomputer L106 determines whether the current position $p_x$ of the correction lens L105 is not less than $b_x$ in Step L809. When the current position $p_x$ of the correction lens L105 is less than $b_x$, the position $p_x$ of the correction lens L105 is located between the object distances n and n+1. Therefore, the lens microcomputer L106 stores the cam parameter in this case in a memory in Step L813 through Step L815. In other words, $\alpha=p_x-a_x$ is set in Step L813, $\beta=b_x-a_x$ is set in Step L814, and $\gamma=n$ is set in Step L815.

The reply of Step L808 is NO when the position px of the correction lens L105 is located at a super infinite position. In this case, the lens microcomputer L106 sets $\alpha=0$ in Step L812, and then proceeds to the processing of Step L814 and stores the cam parameter for the infinity.

The reply of Step L809 is YES when the position $p_x$ of the correction lens L105 is located at a closer distance side. In this case, the lens microcomputer L106 increments the object distance n in Step L810, and determines whether the object distance n is at the infinitely far side relative to the object distance m corresponding to the closest distance in Step L811. When the object distance n is at the infinitely far side relative to the closest distance m, the flow returns to Step L803. The reply of Step L811 is NO when the position $p_x$ of the correction lens L105 is located at a super close distance position. In this case, the lens microcomputer L106 proceeds to the processing of Step L812, and stores the cam parameter for the super close distance.

As described above, in Step L702 of FIG. 7, the lens microcomputer L106 calculates the cam parameters $\alpha$, $\beta$, and $\gamma$ that are used to know which positions on the zoom tracking cam of the zoom tracking cams illustrated in FIG. 2 are the current position of the magnification varying lens L102 and the position of the correction lens L105.

Then, in Step L703, the lens microcomputer L106 predicts a position $Z_x'$ of the magnification varying lens L102 that is to be reached after a predetermined time (for example, after one vertical synchronizing time), i.e. a position moved from the current position $Z_x$ of the magnification varying lens L102, and then the flow proceeds to Step L704. When the magnification varying speed set in Step L701 is defined as Zsp(pps), the position $Z_x'$ of the magnification varying lens after the one vertical synchronizing time is given by the following Expression (5). Symbol pps denotes a unit of representing a rotational speed of a stepping motor, which indicates a rotational step amount (1 step=1 pulse) per one second. The signs (±) in the following Expression (5) change in accordance with the moving direction of the magnification varying lens L102, and the telephoto direction is a plus sign (+) and the wide-angle direction is a minus sign (−).

$$Z_x'=Z_x\pm Zsp/\text{vertical synchronizing frequency} \quad (5)$$

Figure 10:
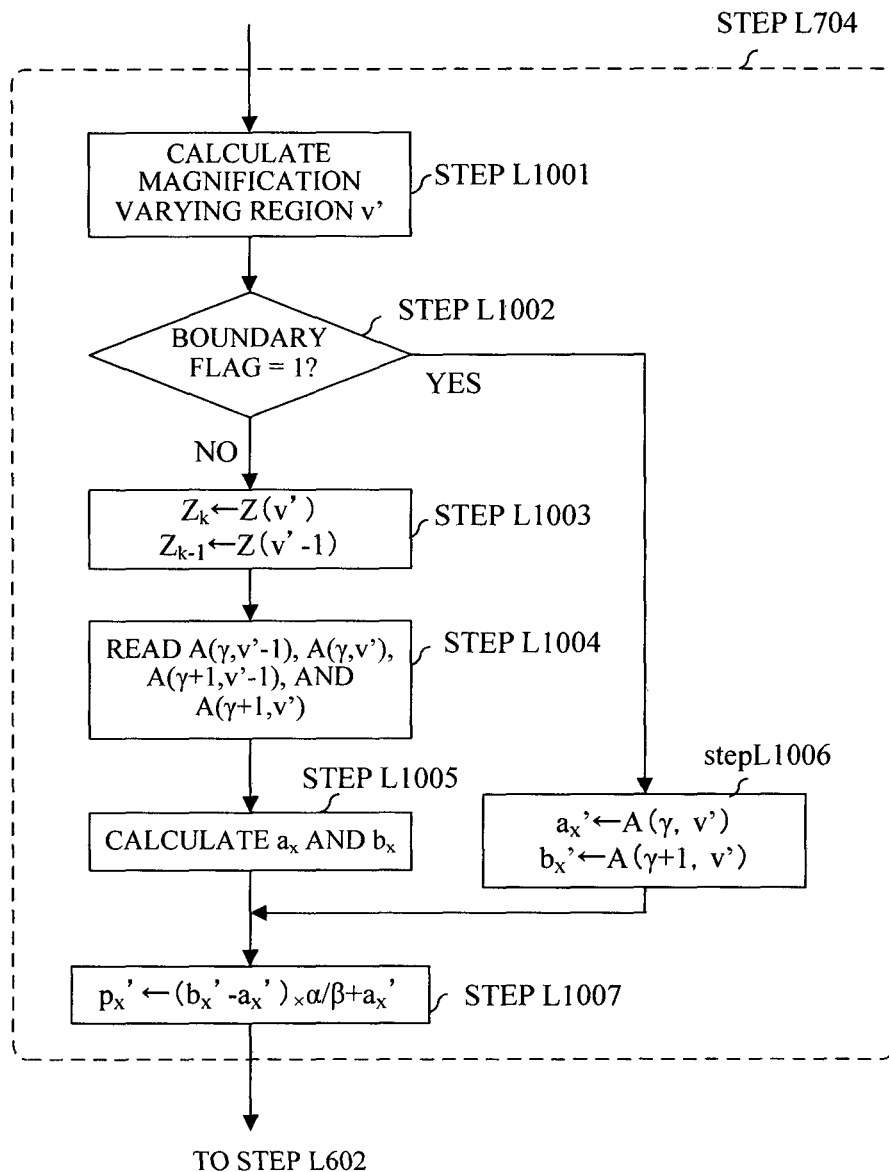
FIG. 10 is a flowchart of illustrating a calculation processing of a correction lens position on a reference cam in Embodiment 1.

Next, in Step L704, the lens microcomputer L106 calculates the position $p_x'$ of the correction lens L105 on the reference cam for the position $Z_x'$ of the magnification varying lens L102 based on the cam parameters $\alpha$, $\beta$, and $\gamma$ calculated in Step L702 and the table data indicating the zoom tracking cam. Referring to FIG. 10, a method of calculating the position $p_x'$ of the correction lens L105 will be described.

In Step L1001 of FIG. 10, the lens microcomputer L106 calculates which magnification varying area v' the position $Z_x'$ of the magnification varying lens L102 exists. In Step L1001, the lens microcomputer L106 performs the processing similar to that illustrated in FIG. 9. In this case, $Z_x$ and v are replaced with $Z_x'$ and v', respectively.

In Step L1002, the lens microcomputer L106 determines whether the position $Z_x'$ of the magnification varying lens L102 after the one vertical synchronizing time exists on the boundary of the magnification varying area. When the boundary flag is 0, the position $Z_x'$ is not located on the boundary and the flow proceeds to the processing of Step L1003.

In Step L1003, the lens microcomputer L106 sets Z (v') and Z(v'−1) as $Z_k$ and $Z_{k-1}$, respectively.

Next, in Step L1004, the lens microcomputer L106 reads four table data A(γ,v'−1), A(γ,v'), A(γ+1,v'−1), and A(γ+1,v') in which the object distance γ is specified by the processing illustrated in FIG. 8. Then, in Step L1005, it calculates values of $a_x'$ and $b_x'$ based on Expressions (2) and (3) described above, respectively.

On the other hand, in Step L1002, when the boundary is determined to be 1, the lens microcomputer L106 proceeds to Step L1006. In Step L1006, the lens microcomputer L106 reads the in-focus position A(γ,v') for the magnification varying area v' at the object distance γ and the in-focus position A(γ+1,v') for the magnification varying area v' at the object distance γ+1, and it stores them as $a_x'$ and $b_x'$, respectively.

Then, in Step L1007, the lens microcomputer L106 calculates a target position $p_x'$ of the correction lens L105 that is a position obtained when the magnification varying lens position reaches $Z_x'$. Referring to Expression (1), the target position of the correction lens L105 after the one vertical synchronizing time is represented as the following Expression (6).

$$p_x'=(b_x'-a_x')\times\alpha/\beta+a_x'-p_x \quad (6)$$

Accordingly, a difference ΔF between the target position and the current position px of the correction lens is represented as the following Expression (7).

$$\Delta F=(b_x'-a_x')\times\alpha/\beta+a_x'-p_x \quad (7)$$

The driving speed of the correction lens L105 is obtained by dividing the difference ΔF of the positions of the correction lens by a moving time of the magnification varying lens L102 that is required for moving this distance. When the magnification varying lens L102 moves at a constant speed from the wide-angle side to the telephoto side, it can be considered that the driving speed of the correction lens L105 is equivalent to an inclination of the zoom tracking cam illustrated in FIG. 2. The driving speed of the correction lens L105 is faster as the magnification varying lens L102 is close to the tele side or the object distance is close to the infinitely far side.

Subsequently, in Step L606 of FIG. 6A, the lens microcomputer L106 sends the zoom information set in Step L603 or Step L604 to the camera microcomputer C106, and then the flow proceeds to Step L607.

In the present embodiment, the camera microcomputer C106 and the lens microcomputer L106 perform two fixed-length packet communications per 1V in synchronization with a vertical synchronizing signal as a first communication and a second communication. The camera microcomputer C106 performs an AF control based on the information of the lens received by the first communication, and sends driving information of the correction lens L105 by the second communication. Sending the zoom information by the lens microcomputer L106 in Step L604 is performed by the first communication.

On the other hand, the camera microcomputer C106 obtains the focus signal that is generated by the AF signal processing circuit C1031 in the camera signal processing circuit C103 in Step C603. Subsequently, in Step C604, the camera microcomputer C106 performs the modulation AF control based on the focus signal obtained in Step C603 and the zoom information received by the lens microcomputer L106. In this case, the camera microcomputer C106 sets the modulation AF control information containing the modulation operation step, the moving direction of the center of the vibration (the infinitely far direction or the close distance direction), the moving timing, zoom corresponding information that indicates whether the control has been switched to the modulation AF control corresponding to the zoom control, and the in-focus degree and the like. The details of a method of setting the modulation AF control information will be described below referring to FIGS. 11, 18, and 19. Subsequently, in Step C605, the camera microcomputer C106 sends the modulation AF control information set in Step C604 to the lens microcomputer L106. The communication in this case corresponds to the second communication described above.

Figure 11:
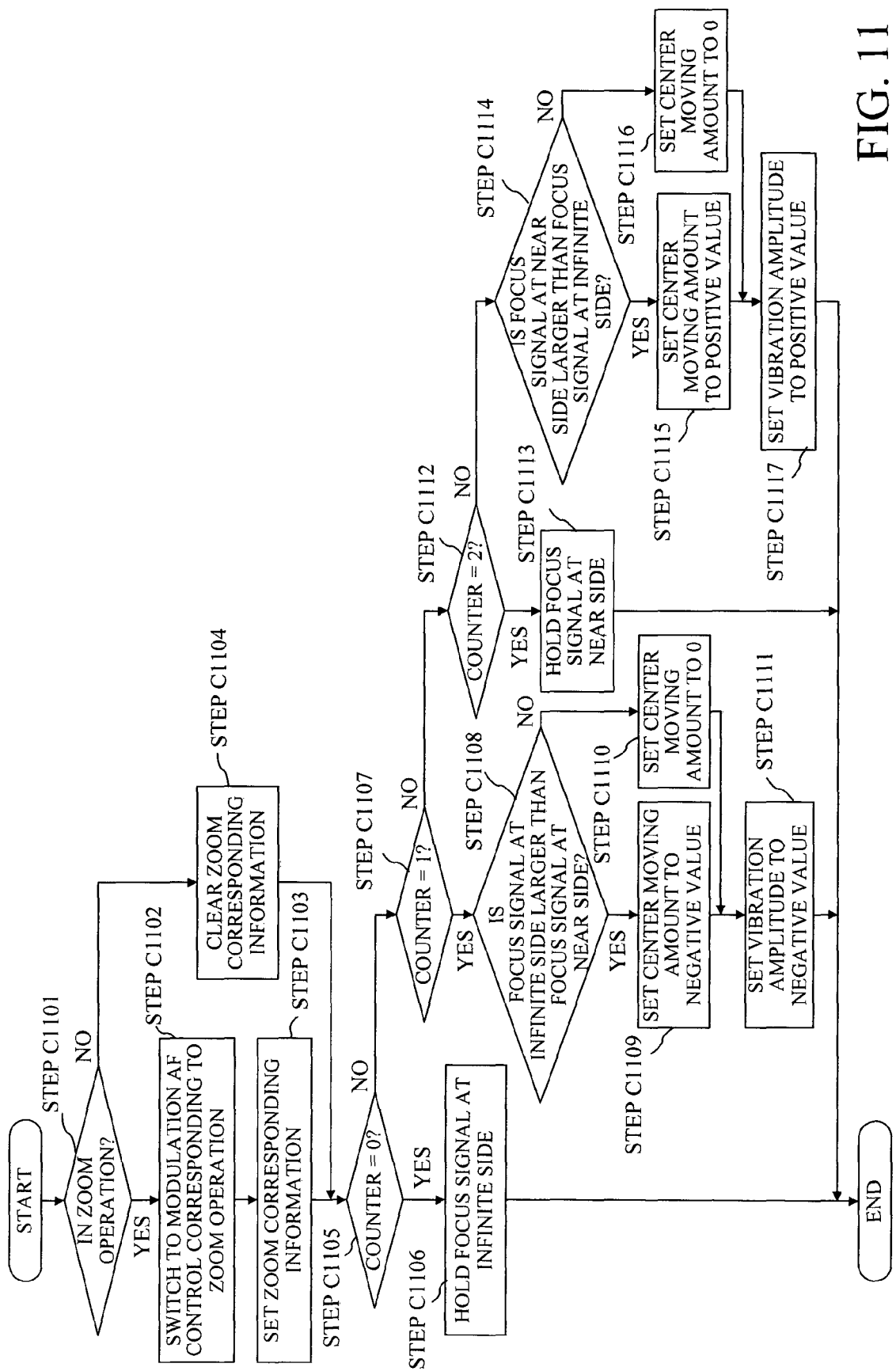
FIG. 11 is a flowchart of illustrating a modulation AF control in Embodiment 1.

Referring to a flowchart of FIG. 11, the modulation AF control that is performed by the AF controller C1061 in the camera microcomputer C106 will be described. The AF controller C1061, in Step C1101, determines whether the magnification varying lens is in a zoom operation in accordance with the zoom information received by the lens microcomputer L106. Then, the flow proceeds to Step C1102 when it is in the zoom operation, and on the other hand, the flow proceeds to Step C1104 when it is not in the zoom operation. In Step C1102, the control is switched to the modulation AF control corresponding to the zoom operation. In the modulation AF control corresponding to the zoom operation, a range of detecting the focus signal, i.e. a size or a position of a detection frame of the focus signal is changed. For example, when the zoom operation is not performed, the detection frame is arranged to cover a whole of a screen in order to focus on various kinds of objects, or it is arranged at a face detection position, a position selected by a user, or the like. On the other hand, when the zoom operation is performed, it is preferred that the detection frame be fixed at a center of the screen since an object in the periphery of the screen is flown to be vanished from the screen. In addition, in the modulation AF control, the focus signal can be obtained in an appropriate exposure state by changing a shift amount for the one vertical synchronizing signal of the drive start timing of the correction lens L105 in accordance with accumulation timing or period of the image pickup element C101 or a position of the detection frame of the focus signal. On the other hand, when the lens is in the zoom operation, the drive start timing for the one vertical synchronizing signal is fixed.

In Step C1103, the zoom corresponding information indicating that the control has been switched to the modulation AF control that corresponds to the zoom operation is set, and then the flow proceeds to Step C1105. In Step C1104, the zoom corresponding information is cleared and then the flow proceeds to Step C1105.

In Step C1105, it is determined whether a counter that indicates the current modulation operation step (hereinafter, referred to as a modulation operation step counter, which is indicated simply as counter in the drawing) is 0. When the modulation operation step counter is 0, the flow proceeds to Step C1106 in which a processing of a case where the correction lens L105 is located at the close distance side is performed. On the other hand, otherwise, the flow proceeds to Step C1107.

In Step C1106, the AF controller C1061 holds the focus signal as a processing of a case where the position of the correction lens L105 is located at the close distance side. The focus signal in this case is obtained in accordance with an image signal (a video signal) that is generated from charges accumulated in the image pickup element C101 when the position of the correction lens L105 is located at the infinitely far side relative to the center of the vibration.

In Step C1107, the AF controller C1061 determines whether the current modulation operation step counter is 1. When the modulation operation step counter is 1, the flow proceeds to Step C1108 in which the modulation AF control information is set. On the other hand, otherwise, the flow proceeds to Step C1112.

In Step C1108, the AF controller C1061 compares the focus signal level at the infinitely far side that is held in Step C1106 with the focus signal level at the close distance side that is held in Step C1113. Then, when the former is larger, the flow proceeds to Step C1109. On the other hand, when the latter is larger, the flow proceeds to Step S1110.

In Step C1109, the AF controller C1061 sets the moving amount and direction of the center of the vibration in the modulation AF control using a value containing a sign. In the present embodiment, when the center of the vibration is moved to the infinitely far direction, a negative value is set. On the other hand, when it is moved to the close distance direction, a positive value is set. In Step C1109, the center moving amount is set by using the negative value. In Step C1110, since the AF controller C1061 sets the movement of the center position of the vibration (hereinafter, referred to as a center movement) to "NONE", the center moving amount is set to 0. The camera microcomputer C106 sends the modulation AF control information containing this information to the lens microcomputer L106 in the processing described below, and the lens microcomputer L106 performs the center movement in the modulation AF control based on this information. In Step C1111, amplitude of a minute vibration (wobbling operation) is set to be a negative value. The vibration is performed in the infinitely far direction with respect to the vibration center position when the vibration amplitude is negative, and on the other hand, the vibration is performed in the close distance direction with respect to the vibration center position when the vibration amplitude is positive.

In Step C1112, the AF controller C1061 determines whether the current modulation operation step counter is 2. When the modulation operation step counter is 2, the flow proceeds to Step C1113 in which a processing of a case where the correction lens L105 is located at the infinitely far side is performed. On the other hand, when the current modulation operation step counter is other than 2, the flow proceeds to Step C1114.

In Step C1113, the AF controller C1061 holds the focus signal as a processing of the case where the position of the correction lens L105 is located at the infinitely far side. The focus signal in this case is obtained in accordance with the image signal that is generated from the charges accumulated in the image pickup element C101 when the position of the correction lens L105 is located at the close distance side relative to the center of the vibration.

In Step C1114, the AF controller C1061 compares the focus signal level at the closer distance side that is held in Step C1113 with the focus signal level at the infinitely far side that is held in Step C1106. Then, when the former is larger, the flow proceeds to Step C1115. On the other hand, when the latter is larger, the flow proceeds to Step S1116.

In Step C1115, the AF controller C1061 sets the center moving amount in the modulation AF control is set by using a positive value. In Step C1116, since the center movement is set to "NONE", the center moving amount is set to 0. In Step C1117, amplitude of a minute vibration (wobbling operation) is set to be a positive value.

Figure 12:
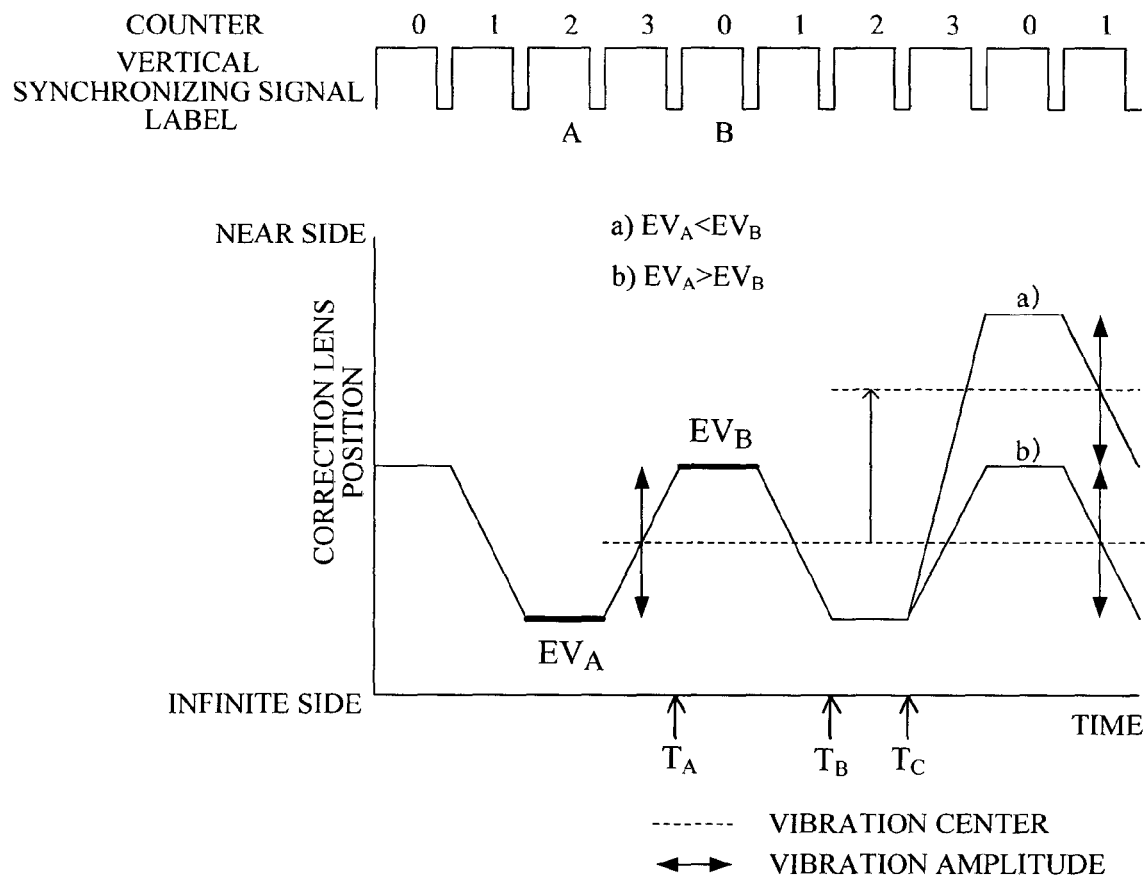
FIG. 12 is a diagram of illustrating a motion of the correction lens in the modulation AF control of Embodiment 1.

Referring to FIG. 12, the change of the position of the correction lens L105 based on the modulation AF control information will be described. FIG. 12 is a diagram of illustrating an operation of the correction lens L105 in the modulation AF control of the present embodiment. At the upper side in FIG. 12, a vertical synchronizing signal of the image signal is indicated. In a graph at the lower side in FIG. 12, a lateral axis indicates a time and a vertical axis indicates a position of the correction lens L105.

A focus signal $EV_A$ that is generated from the charges accumulated in the image pickup element C101 at the time of label A is taken in the AF signal processing circuit C1031 in the camera signal processing circuit C103 at time $T_A$. In addition, a focus signal $EV_B$ that is generated from the charges accumulated in the image pickup element C101 at the time of label B is taken in the AF signal processing circuit C1031 at time $T_B$.

At time $T_C$, the AF signal processing circuit C1031 compares the focus signal $EV_A$ with the focus signal $EV_B$, and sets the modulation AF control information so as to move the vibration center position only when the focus signal $EV_B$ is larger than the focus signal $EV_A$. Symbol a) in the drawing indicates a case where the vibration center position is moved to the close distance side, and symbol b) indicates a case where the vibration center position is not moved. Thus, moving the vibration center position in a direction where the focus signal is heightened, the in-focus position can be detected.

Figure 17:
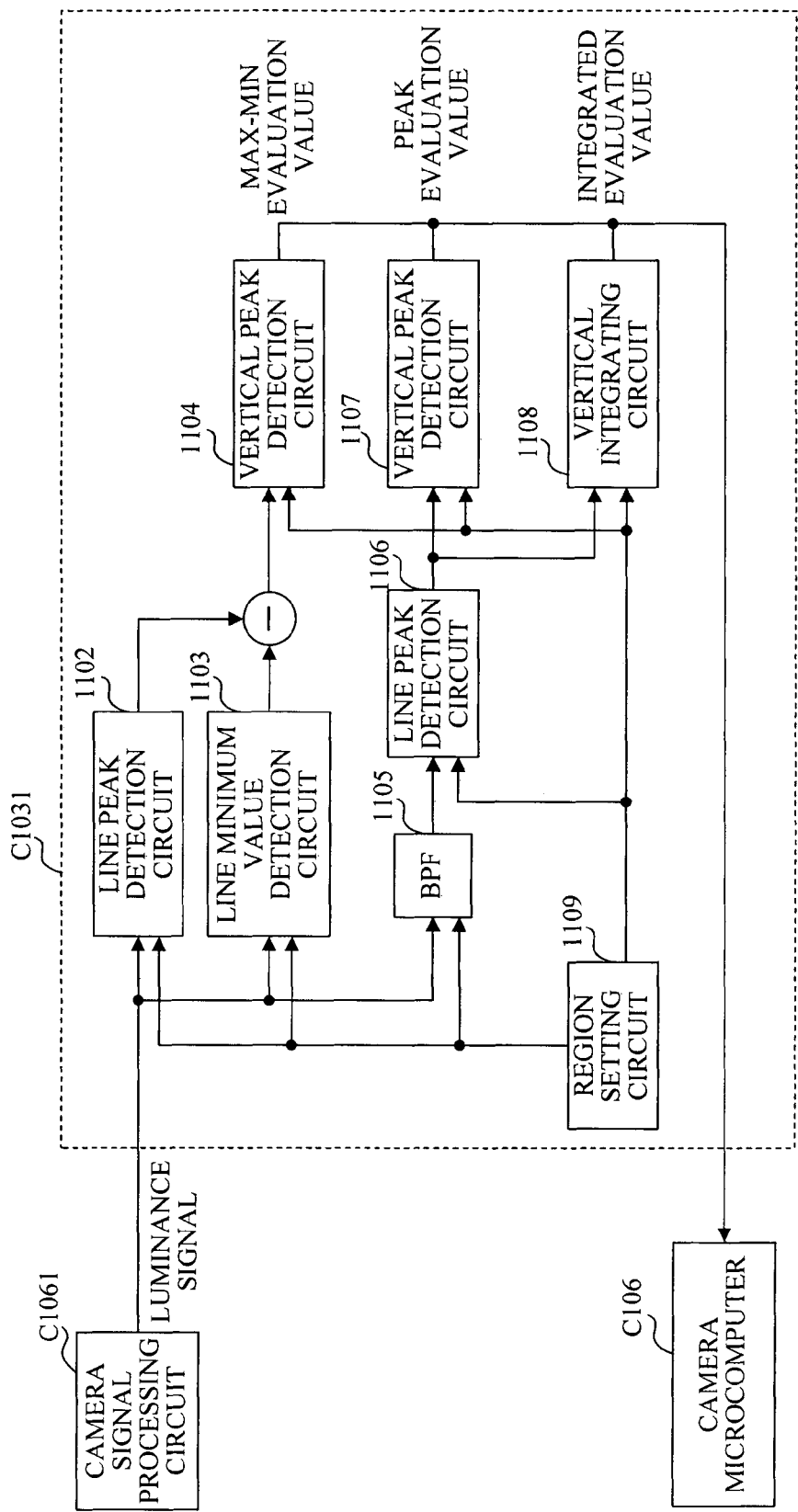
FIG. 17 is a block diagram of illustrating a configuration of an AF signal processing circuit in Embodiment 1.
Figure 18:
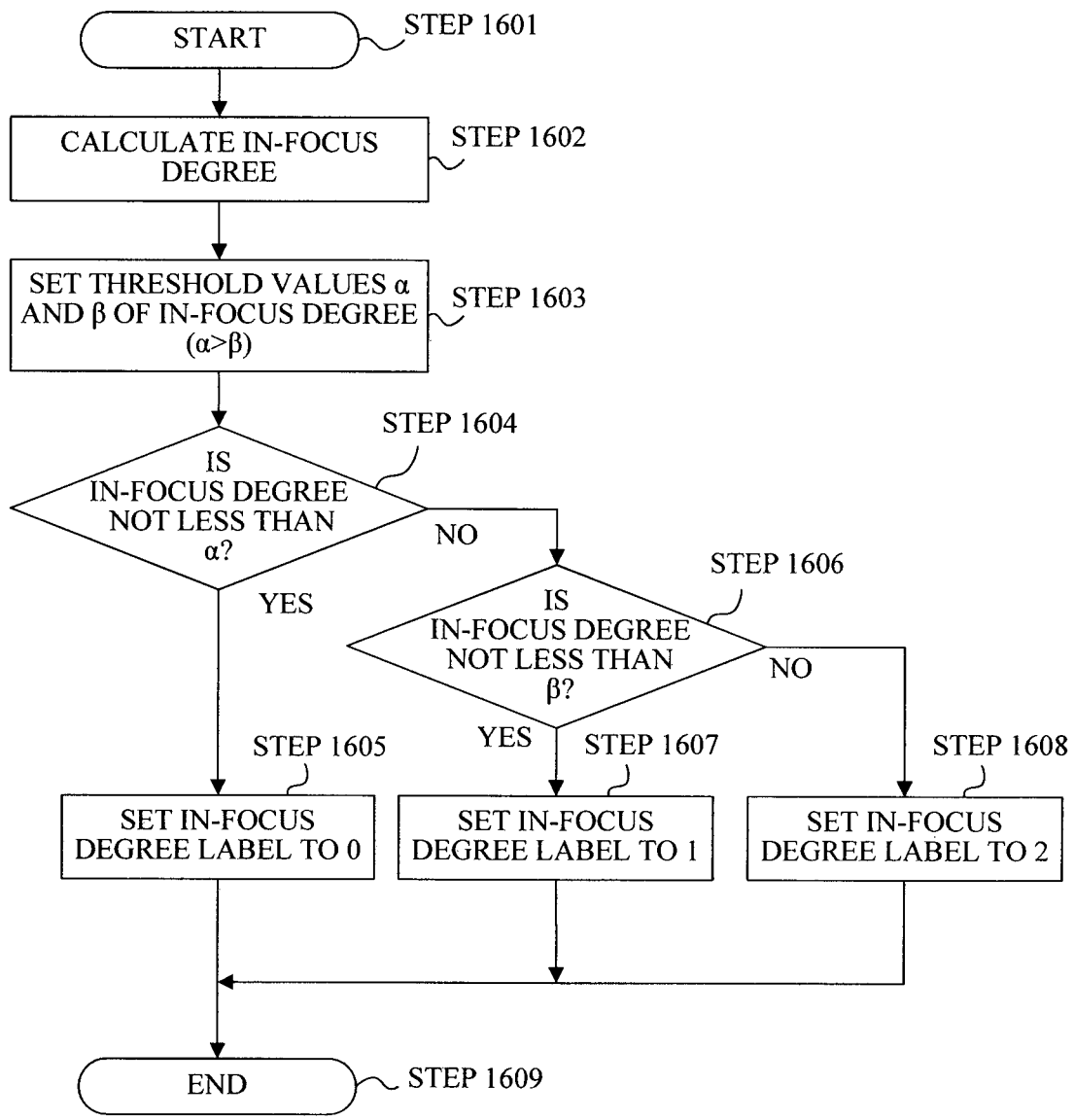
FIG. 18 is a flowchart of illustrating a processing of generating in-focus degree information in Embodiment 1.

Next, referring to FIGS. 17 and 18, a calculation of the in-focus degree information will be described. In FIG. 18, when a processing is started in Step 1601, the camera microcomputer C106 calculates the in-focus degree in Step 1602. The in-focus degree is an index that indicates the degree of the in-focus state of an image signal (a video signal) generated from the output signal from the image pickup element C101, and an image blur is reduced as the in-focus degree is increased and on the other hand, the image blur is enlarged as the in-focus degree is decreased.

The in-focus degree information may be the in-focus degree itself that is obtained by a calculating formula described below, or alternatively, information on the in-focus degrees divided by a rank or other information corresponding to the in-focus degree may also be used. A method of generating the focus signal to obtain the in-focus degree information will be described along with the configuration of the AF signal processing circuit C1031 illustrated in FIG. 17.

The camera signal processing circuit C103 generates a luminance signal to obtain the focus signal from the output signal of the image pickup element C101, and inputs the luminance signal to the AF signal processing circuit C1031. In the AF signal processing circuit C1031, the following evaluation value is generated as the focus signal.

"Max-Min Evaluation Value"

The luminance signal described above is inputted to a line peak detection circuit 1102. The line peak detection circuit 1102 obtains a peak value of the luminance for each horizontal line in a focus signal extracting region, set by a region setting circuit 1109, of all pixels of the image pickup element C101. The luminance signal is also inputted to a line minimum value detection circuit 1103. The line minimum value detection circuit 1103 detects a minimum value of the luminance for each horizontal line in the focus signal extracting region set by the region setting circuit 1109. The detected peak value and minimum value of the luminance for each horizontal line are inputted to a subtractor, and a result obtained by subtracting the minimum value from the peak value is inputted to a vertical peak detection circuit 1104.

The vertical peak detection circuit 1104 performs a peak hold in a vertical direction in the focus signal extracting region, and generates the Max-Min evaluation value. The Max-Min evaluation value indicates a maximum value of a contrast in the focus signal extracting region, which is used for the determination of a low contrast or a high contrast.

"Peak Evaluation Value"

The luminance signal described above is also inputted to a BPF 1105 (a band-pass filer). The BPF 1105 extracts a predetermined frequency component of the luminance signal and generates the focus signal. Then, the focus signal is inputted to the line peak detection circuit 1106 to detect the peak value for each horizontal line. The line peak detection circuit 1106 obtains the peak value for each horizontal line in the focus signal extracting region set by the region setting circuit 1109. The obtained peak value is held by the vertical peak detection circuit 1107 in the vertical direction in the focus signal extracting region, and as a result, a peak evaluation value is generated. The peak evaluation value is increased as an edge of the image is sharp, and on the other hand, the value is decreased as the edge is blurred. Since the change of the peak evaluation value is small even when the object is moved, it can be used for a restart determination to move to a processing of searching an in-focus point from the in-focus state again.

"Integrated Evaluation Value"

When the peak value obtained by the line peak detection circuit 1106 is integrated by a vertical integrating circuit 1108 in the vertical direction in the focus signal extracting region so as to generate an integrated evaluation value. Since the integrated evaluation value has a wide dynamic range by the effect of the integration and has a high sensitivity, it is mainly used in the AF control.

The above AF evaluation value generated by the AF signal processing circuit C1031 is inputted to the camera microcomputer C106.

In the present embodiment, in Step 1602, the camera microcomputer C106 (the AF controller C1061) calculates the in-focus degree using the "Max-Min evaluation value" and the "Peak evaluation value" by the following Expression (8).

$$\text{In-focus degree} = (\text{Peak evaluation value}/\text{Max-Min evaluation value}) \times 100 \qquad (8)$$

As the peak evaluation value is reduced with respect to the Max-Min evaluation value, the edge of the image signal is weaken and the image is blurred, and on the other hand, as the peak evaluation value is increased, the edge is enhanced and the image is close to the in-focus state. Thus, normalizing the peak evaluation value that indicates the strength of the edge by the Max-Min evaluation value that indicates the maximum value of the contrast, a simple in-focus degree can be obtained.

Next, in Step 1603, the camera microcomputer C106 sets the threshold values $\alpha$ and $\beta$ ($\alpha > \beta$) related to the in-focus degree. The high, medium, and low of the in-focus degree are classified at the boundaries of these threshold values $\alpha$ and $\beta$, and the vibration amplitude and the center moving amount which are suitable for the in-focus degree are set. A state where the in-focus degree is a high state in which the in-focus degree is not less than the threshold value $\alpha$ is in an in-focus state or a state near the in-focus state. A state where the in-focus degree is a medium state in which the in-focus degree is less than the threshold value $\alpha$ and is not less than the threshold value $\beta$ is in a state where the image is slightly blurred. A state where the in-focus degree is a low state in which the in-focus degree is less than the threshold value $\beta$ is in a state where the image is significantly blurred.

Next, in Step 1604, the camera microcomputer C106 determines whether the current in-focus degree is not less than the threshold value $\alpha$, and the flow proceeds to Step 1605 when the in-focus degree is not less than the threshold value $\alpha$, and on the other hand, otherwise, the flow proceeds to Step 1606.

In Step 1605, the camera microcomputer C106 sets an in-focus degree label that indicates the classification of the high or low of the in-focus degree to 0 (zero).

In Step 1606, the camera microcomputer C106 determines whether the in-focus degree is not less than the threshold value $\beta$, and the flow proceeds to Step 1607 when the in-focus degree is not less than the threshold value $\beta$, and on the other hand, otherwise, the flow proceeds to Step 1608.

In Step 1607, the camera microcomputer C106 sets the in-focus degree label to 1. In Step 1608, the camera microcomputer C106 sets the in-focus degree label to 2. Thus, when the camera microcomputer C106 sets the in-focus degree label in Step 1605, 1607, or 1608, it finishes the processing in Step 1609.

The in-focus degree label of the present embodiment is a label that indicates the classification as to whether the in-focus degree is high or low as described above. The high state where the in-focus degree is not less than the threshold value $\alpha$ is the in-focus state or the state close to the in-focus state, which is indicated as the in-focus degree label of 0 (zero). The medium state where the in-focus degree is less than the threshold value $\alpha$ and is not less than the threshold value $\beta$ is a state where the image is slightly blurred, which is indicated as the in-focus degree label of 1. The low state where the in-focus degree is less than the threshold value $\beta$ is a state where the image is significantly blurred, which is indicated as the in-focus degree label of 2. Thus, in the present embodiment, the classification as to whether the in-focus degree is high or low is performed by the camera body instead of the lens unit.

The lens microcomputer L106 sets the vibration amplitude M and the center moving amount W to be large in accordance with the in-focus degree information received from the camera microcomputer C106. The lens microcomputer L106 may also set the vibration amplitude M and the center moving amount W to be equal to, 1.5 times, and 2.0 times of a reference value when the in-focus degree label is 0 (near the in-focus state), 1 (small amount of blurring), and 2 (large amount of blurring), respectively.

In the present embodiment, the camera microcomputer C106 and the lens microcomputer L106 perform a fixed-length packet communication, and a predetermined data region that corresponds to the in-focus degree information is provided in the packet. The camera microcomputer C106 changes a signal level in the predetermined data region corresponding to the in-focus degree information in accordance with the in-focus degree. In the present embodiment, the camera microcomputer C106 sends zoom corresponding information indicating that the control has been switched to the modulation AF control corresponding to the zoom control and the in-focus degree information in the same data region. Specifically, the camera microcomputer C106 sets the information that indicate any one of "near the in-focus state", "small amount of blurring", and "large amount of blurring" as described above to the data region as the in-focus degree information. In this case, the lens microcomputer L106 determines that the camera microcomputer C106 has switched to the modulation AF control that corresponds to the zoom control based on the received data. On the other hand, the camera microcomputer C106 sets information different from any of the information of "near the in-focus state", "small amount blurring", and "large amount of blurring" to the data region when the camera microcomputer C106 has not switched to the modulation AF control. In this case, the lens microcomputer L106 determines that the camera microcomputer C106 has not switched to the modulation AF control corresponding to the zoom control based on the received data.

The description is returned to FIG. 6A. In Step L607, the lens microcomputer L106 calculates the vibration amplitude M and the center moving amount W based on the modulation AF control information from the camera microcomputer C106 and the data unique to the lens unit L100 stored in the lens unique data storage unit L1061. The vibration amplitude M and the center moving amount W are used for the modulation AF control. The vibration amplitude M corresponds to a moving amount of the correction lens L105 in a vibration direction, and the center moving amount W is a moving amount of the vibration center of the correction lens L105, and in the present embodiment, it means the movement is in the close distance direction when the value is positive, and on the other hand, the movement is in the infinitely far direction when the value is negative. As described above, the data unique to the lens unit L100 are data of the zoom tracking cam, the control resolution of the correction lens actuator L108, or the like.

As the data unique to the lens unit L100, a position sensitivity that indicates an image plane moving amount per unit moving amount of each of the magnification varying lens L102 and the correction lens L105 may also be stored in the lens unique data storage unit L1061. Then, the vibration amplitude M and the center moving amount W may also be calculated based on the position sensitivity.

The vibration amplitude M is set on the basis of the depth of focus that is determined by the diameter δ of the permissible circle of confusion received in Step L601 and the F-number. The focus signal indicates the peak value at the in-focus position and reduces as the distance from the in-focus position, which has a mound shape nearly symmetric bilaterally. In order to detect the decrease or increase of the focus signal, the correction lens L105 needs to be moved to a position at a distance from the in-focus position to some extent. However, commonly, the vibration amplitude M is set to be the moving amount in which the blurring cannot be recognized on the image in accordance with the diameter δ of the permissible circle of confusion and the F-number, since the blurring appears when the distance from the in-focus position is larger than the depth of focus.

The depth of focus also changes at the position of the magnification varying lens L102. Therefore, it is preferred that the vibration amplitude M be set to be large at the telephoto side where the depth of focus is deep in order to sufficiently obtain the change of the focus signal. In addition, as illustrated in FIG. 2, an interval between the zoom tracking cams or a shape such as the inclination is changed in accordance with the position of the magnification varying lens L102. Therefore, commonly, the center moving amount W is also changed in accordance with the position of the magnification varying lens L102. For example, the center moving amount W may be small at the wide-angle side where the zoom tracking cam is converged. On the other hand, the focus position can be easily detected and the response is improved if the center moving amount W is set to be large at the telephoto side where the interval between the zoom tracking cams is wide.

When the image of the object is significantly blurred, the vibration amplitude M and the center moving amount W are set to be large in order to perform the focusing at high speed. According to this setting, the in-focus direction can be found quickly and the correction lens can be moved to the in-focus position quickly. The camera microcomputer C106 calculates the in-focus degree of the object in accordance with the focus signal, the luminance signal, the contrast signal, or the like, and sends the in-focus degree information to the lens microcomputer L106.

Figure 19:
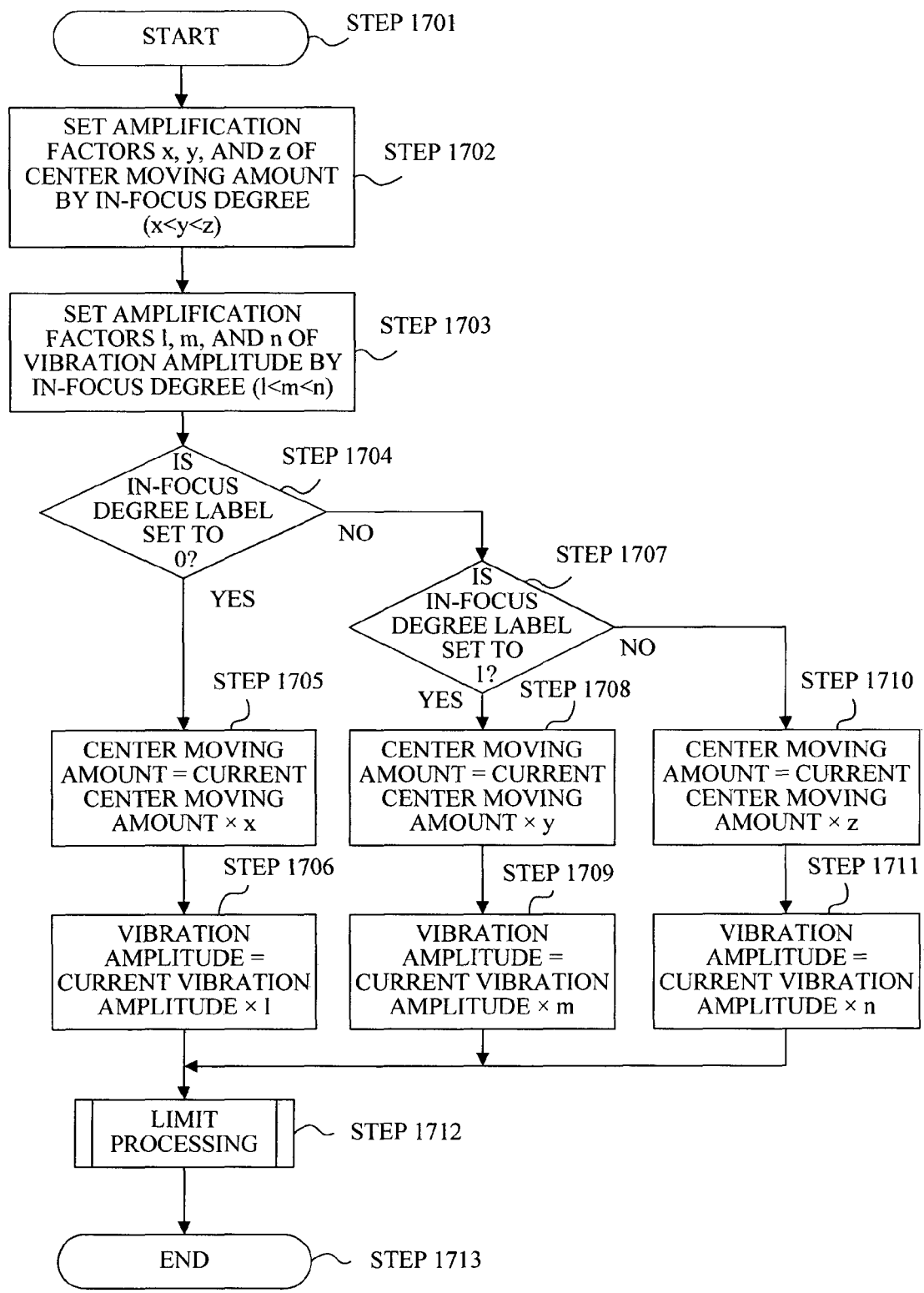
FIG. 19 is a flowchart of illustrating a processing of setting a modulation control amount in accordance with the in-focus degree information in Embodiment 1.

The lens microcomputer L106 calculates the vibration amplitude and the center moving amount again in accordance with the received in-focus degree information. When the in-focus state has been already obtained, the moving amount of the vibration amplitude may be reset so that the blur cannot be recognized on the image as described above. In order to prevent the transfer to a wrong zoom tracking cam, it is preferred that the center moving amount is also set to be small. However, when the in-focus state has not been obtained and the blur is generated, the vibration amplitude and the center moving amount should be set to be larger to improve the response in order to quickly escape the blurring state to move to the in-focus state. Referring to FIG. 19, the details of the processing in this case will be described.

When the processing is started in Step 1701 of FIG. 19, the lens microcomputer L106 sets an amplification factors (gains) x, y, and z (x<y<z) of the center moving amount depending on the in-focus degree labels 0, 1, and 2, respectively, in Step 1702.

In Step 1703, the lens microcomputer L106 sets the amplification factors (the gains) l, m, n (l<m<n) of the vibration amplitude depending on the in-focus degree labels 0, 1, and 2, respectively. In the present embodiment, the amplification factor is set to be larger as the in-focus degree is low, and on the other hand, the amplification factor is set to be smaller as the in-focus degree is high.

In Step 1704, the lens microcomputer L106 determines whether the current in-focus degree label is 0 (zero) or not, and the flow proceeds to Step 1705 when it is zero, and on the other hand, otherwise, the flow proceeds to Step 1707.

In Step 1705, the lens microcomputer L106 multiplies the amplification factor x by the currently set center moving amount to obtain a new center moving amount. In addition, in Step 1706, the lens microcomputer L106 multiplies the amplification factor l by the currently set vibration amplitude to obtain new vibration amplitude. Thus, when the in-focus degree label is 0 and the state is the in-focus state or near the in-focus state, the new center moving amount and vibration amplitude are set by multiplying the minimum amplification factors x and l by the current center moving amount and vibration amplitude.

In Step 1707, the lens microcomputer L106 determines whether the current in-focus degree label is 1 or not, and the flow proceeds to Step 1708 when the in-focus degree label is 1, and on the other hand, otherwise, the flow proceeds to Step 1710.

In Step 1708, the lens microcomputer L106 multiplies an amplification factor y by the currently set center moving amount so as to obtain a new center moving amount. In addition, in Step 1709, the lens microcomputer L106 multiplies an amplification factor m by the currently set vibration amplitude so as to obtain new vibration amplitude. Thus, in the state where the in-focus degree label is 1 and the image is slightly blurred, the new center moving amount and vibration amplitude are set by multiplying the amplification factors y and m that are slightly large (larger than x and l) with respect to the current center moving amount and vibration amplitude, respectively.

In Step 1710, since the in-focus degree label is 2, the lens microcomputer L106 multiplies an amplification factor z by the currently set center moving amount so as to obtain a new center moving amount. In addition, in Step 1711, the lens microcomputer L106 multiplies an amplification factor n by the currently set vibration amplitude so as to obtain new vibration amplitude. Thus, in the state where the in-focus degree label is 2 and the image is significantly blurred, the new center moving amount and vibration amplitude are set by multiplying the amplification factors z and n that are large (larger than y and m) with respect to the current center moving amount and vibration amplitude, respectively.

Thus, the lens microcomputer L106 that has set the center moving amount and the vibration amplitude depending on the in-focus degree label performs a limit processing in Step 1712, and finishes the processing in Step 1713.

Figure 20:
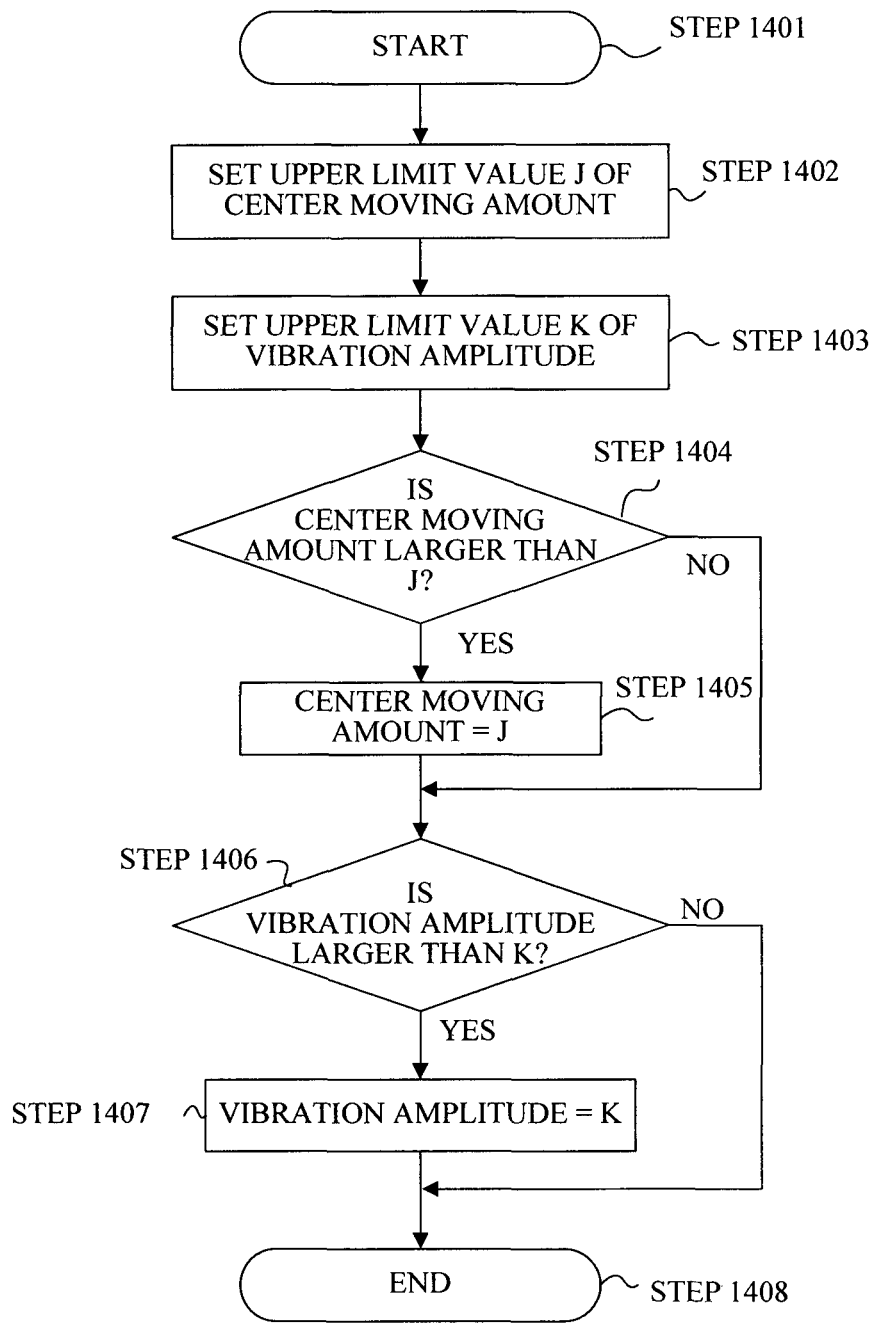
FIG. 20 is a flowchart of illustrating a limit processing of the modulation control amount in Embodiment 1.

Hereinafter, referring to a flowchart of FIG. 20, the limit processing that is performed in Step 1712 will be described.

When the processing starts in Step 1401, the lens microcomputer L106 sets an upper limit value of the center moving amount as J in Step 1402. In Step 1403, the lens microcomputer L106 sets an upper limit of the vibration amplitude as K in Step 1403.

Next, in Step 1404, the lens microcomputer L106 determines whether the current center moving amount is larger than the upper limit value J, and then the flow proceeds to Step 1405 when the current center moving amount is larger than the upper limit value J, and on the other hand, otherwise, the flow proceeds to Step 1406.

In Step 1405, the lens microcomputer L106 sets the upper limit value J as the center moving amount, and then the flow proceeds to Step 1406.

In Step 1406, the lens microcomputer L106 determines whether the current vibration amplitude is larger than an upper limit value K, and then the flow proceeds to Step 1407 when the current vibration amplitude is larger than the upper limit value K, and on the other hand, otherwise, the flow proceeds to Step 1408 and the processing is finished.

In Step 1407, the lens microcomputer L106 sets the upper limit value K as the vibration amplitude, and then the processing is finished in Step 1408.

Thus, in the present embodiment, the upper limit values J and K are provided for the setting of the center moving amount and the vibration amplitude, respectively. This is because the inconvenience which is generated when the calculated center moving amount or vibration amplitude is too large is avoided. For example, when the in-focus degree is temporarily lowered by generating the vibration of the camera system in a state where the in-focus state is obtained during varying the magnification, the blur caused by the modulation AF control may be prominent if an excessive center moving amount or vibration amplitude is set. Therefore, if the center moving amount or the vibration amplitude is configured so as not be set to a value beyond the upper limit value, the prominence of such a blur can be prevented.

The upper limit value may also be set to be large as the interval between the plurality of zoom tracking cams illustrated in FIG. 2 is large. In addition, based on the current focal length, the upper limit value may also be set to be large when the depth of focus is deep. For example, a value of three times of the interval between the zoom tracking cams or the depth of focus may be set as the upper limit value.

The description is returned to FIG. 6B. In Step L608, the lens microcomputer L106, similarly to Step L602, determines whether the magnification varying lens is in the zoom operation based on the change of the output of the magnification varying lens position sensor L107. When the magnification varying lens is in the zoom operation, the flow proceeds to Step L609. On the other hand, when the magnification varying lens is not in the zoom operation, the flow proceeds to Step L612.

In Step L609, the lens microcomputer L106 determines whether the modulation AF control information received from the camera microcomputer C106 is modulation AF control information corresponding to the zoom operation. When the received modulation AF control information corresponds to the zoom operation, the flow proceeds to Step L610. On the other hand, when this modulation AF control information does not correspond to the zoom operation, the flow proceeds to Step L611.

In Step L610, the lens microcomputer L106 calculates a target drive position Fx' of the correction lens L105 using the following Expression (9) based the vibration magnitude M and the center moving amount W calculated in Step L607 and the position px' of the correction lens L105 on a reference cam locus calculated in Step L605.

$$Fx'=px'+(M+W) \quad (9)$$

In Expression (9), when W is 0 (zero), it indicates that there is no center movement. In addition, in accordance with the signs of the vibration magnitude M and the center moving amount W, it is determined whether the target drive position Fx' is at the infinitely far side or the close distance side relative to the position px' of the correction lens L105 on the reference cam locus.

In Step L611, the modulation AF control that is performed by the camera microcomputer C106 does not correspond to the zoom operation. Therefore, the vibration amplitude M and the center moving amount W calculated in Step L607 are not overlapped with the position px' of the correction lens L105 calculated in Step L605, and the target drive position Fx' of the correction lens L105 using the following Expression (10).

$$Fx'=px' \quad (10)$$

As a result, even when the camera side does not complete the switching to the modulation AF control corresponding to the zoom control in performing the zoom operation, at least the zoom tracking control is performed. Therefore, even when the cam specifying control cannot be performed, the image plane movement caused by the zoom operation can be corrected and therefore the focusing is not greatly missed.

In Step L612, the vibration amplitude M and the center moving amount W calculated in Step L607 are overlapped with the current position px of the correction lens L105, and the target drive position Fx' of the correction lens L105 is calculated using the following Expression (11).

$$Fx'=px+(M+W) \quad (11)$$

This means that a so-called AF control is performed when the zoom operation is not performed (while the zoom operation is stopped), instead of the cam specifying control caused by the zoom operation.

Figure 13:
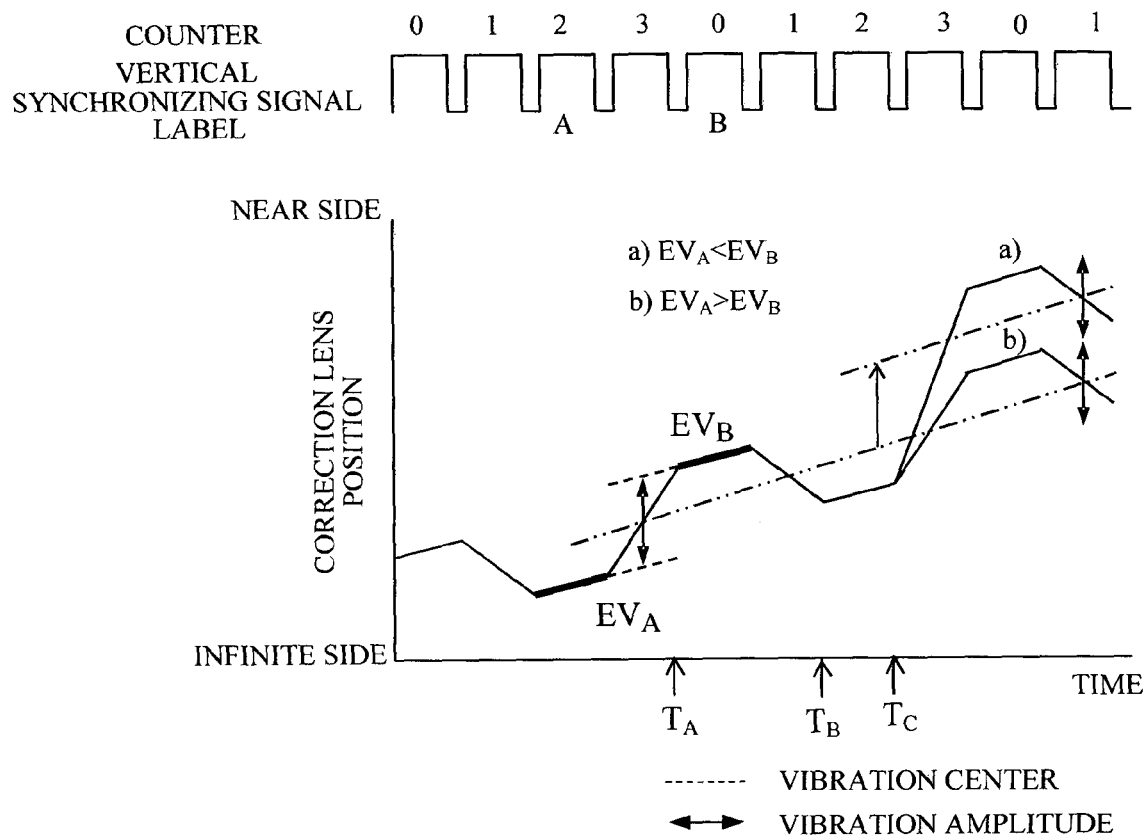
FIG. 13 is a diagram of illustrating a motion that is obtained by overlapping the modulation AF control with the zoom tracking control in Embodiment 1.

Next, referring to FIG. 13, the movement of the correction lens L105 when the minute vibration caused by the modulation AF control is overlapped with the movement by the zoom tracking control will be described. FIG. 13 is a diagram of illustrating the operation in which the modulation AF control is overlapped with the zoom tracking control. A vertical synchronizing signal of an image signal is indicated at the upper side in FIG. 13, and a lateral axis in the graph at the lower side in FIG. 13 indicates a time and a vertical axis indicates a correction lens position.

In the modulation AF control during varying the magnification, the vibration center is a correction lens position on the reference cam which is followed, and the inclination of the reference cam as the vibration center changes in accordance with the object distance and the magnification varying lens position. FIG. 13 indicates a case where the modulation operation is performed with a period of four vertical synchronizing times (4V), and the modulation operation includes four modulation operation steps as described below.

When the modulation operation counter is 0 (zero), the correction lens L105 is moved so that a relative position relation between the position obtained when this counter is 3 and the vibration center is maintained. When the modulation operation step counter is 1, the correction lens L105 is moved from the vibration center to the position at the infinitely far side (minus (−) direction) by the vibration amplitude. When the modulation operation step counter is 2, the correction lens L105 is moved so that a relative position relation between the position obtained when this counter is 1 and the vibration center is maintained. When the modulation operation step counter is 3, the correction lens L105 is moved from the vibration center to the position at the close distance side (plus (+) direction) by the vibration amplitude.

The movement of the correction lens L105 when the modulation operation step counter is 1 or 3 is, that is to say, a movement (a first movement) in which the movement in the vibration of the modulation AF control is overlapped with the correction lens L105 moved by the zoom tracking control. Furthermore, the movement of the correction lens L105 when the modulation operation step counter is 0 or 2 is, that is to say, a movement (a second movement) in which the relative position relation between the position of the correction lens L105 after a first movement and the vibration center on the reference cam is maintained. The camera microcomputer C106 determines whether the correction lens L105 can reach a target position of the first movement, and the lens microcomputer L106 continues the first movement instead of performing the second movement when the camera microcomputer C106 determines that the correction lens L105 cannot reach the target position.

In the present embodiment, it is described that the lens microcomputer L106 switches the moving direction of the correction lens L105 in the modulation AF control in accordance with the sign of the vibration amplitude and the center moving amount received from the camera microcomputer C106. However, the modulation operation step itself or the information of the presence or absence of the modulation, or its moving direction (at the infinitely far side or the close distance side) may also be transferred so as to realize the modulation operation. The period of the modulation operation is not limited to 4V. The switching period of the modulation operation step may also be changed in accordance with a length of a charge accumulation time of the image pickup element C101.

Similarly to FIG. 12, the focus signal $EV_A$ that is generated from the charges accumulated in the image pickup element C101 at the time of label A is taken into the camera microcomputer C106 at a time $T_A$. In addition, the focus signal $EV_B$ that is generated from the charges accumulated in the image pickup element C101 at the time of label B is taken into the camera microcomputer C106 at a time $T_B$. At a time $T_c$, the focus signal $EV_A$ is compared with the focus signal $EV_B$, and the vibration center is moved only when the focus signal $EV_B$ is larger than the focus signal $EV_A$.

Figure 14A:
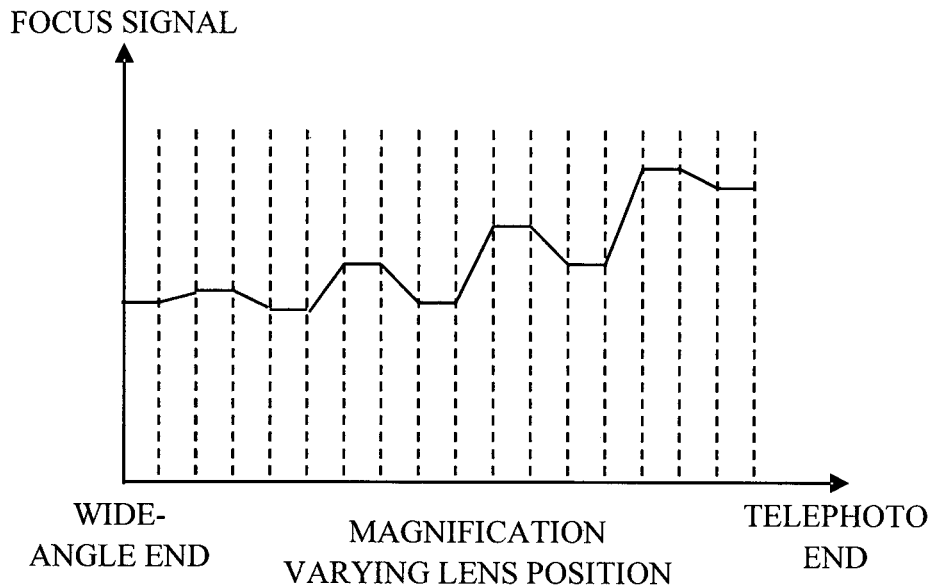
FIG. 14A is a diagram of illustrating a zoom tracking cam specifying control during varying the magnification in Embodiment 1.
Figure 14B:
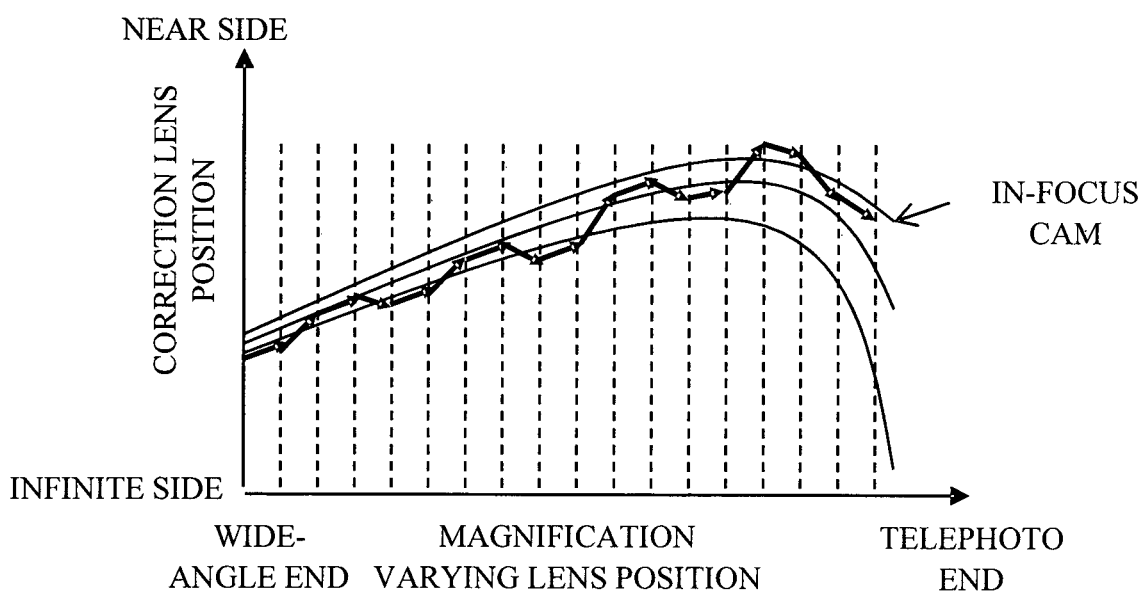
FIG. 14B is a diagram of illustrating a zoom tracking cam specifying control during varying the magnification in Embodiment 1.

FIGS. 14A and 14B are diagrams of illustrating the zoom tracking cam specifying control during varying the magnification. As illustrated in FIGS. 14A and 14B, the zoom tracking cam that is to be followed (an in-focus cam in FIG. 14B) can be specified by moving the vibration center in a direction of increasing a value of the focus signal (in FIG. 14A) repeating the modulation operation.

The description is returned to FIG. 6B. In Step L613, the lens microcomputer L106 calculates a drive speed Fsp of the correction lens L105 to reach the target position Fx' set in Step L610, Step L611, or Step L612. During the zoom operation, the drive speed Fsp of the correction lens L105 is obtained by dividing the difference between the target drive position Fx' of the correction lens in which the modulation amplitude has been overlapped and the current position px of the correction lens by a moving time of the magnification varying lens L102 that is required to move this distance. In other words, the drive speed Fsp of the correction lens L105 is calculated by the following Expression (12).

$$Fsp=|Fx'-px|/\text{Moving time of the magnification varying lens} \quad (12)$$

When the zoom operation is stopped, the drive speed Fsp of the correction lens L105 is obtained by dividing the difference between the target drive position Fx' of the correction lens and the current position px of the correction lens by one vertical synchronizing time.

In Step L614, the lens microcomputer L106 determines whether the correction lens L105 can reach the target position within a predetermined time when the lens microcomputer L106 drives the correction lens L105 at the drive speed Fsp of the correction lens L105 calculated in Step L606. Information on the predetermined time is contained in the information sent by the camera microcomputer C106 in Step C605. When the lens microcomputer L106 determines that the correction lens L105 can reach the target position with the predetermined time, the flow proceeds to Step L615. On the other hand, when it determines that the correction lens L105 cannot reach the target position within the predetermined time, the flow proceeds to Step L616. In Step L615, the information of "reachable" is set to correction lens target position reaching information that is sent to the camera microcomputer C106, and then the flow proceeds to Step 617. In Step L616, the information of "unreachable" is set to the correction lens target position reaching information, and then the flow proceeds to Step L617.

In Step L617, the lens microcomputer L106 sends the correction lens target position reaching information to the camera microcomputer C106. In the modulation AF control, as the moving amount of the correction lens L105 where the modulation amplitude M and the center moving amount W are adjusted is larger, it is necessary to speed up the drive speed of the correction lens L105 in order to move the correction lens L105 within the predetermined time. However, in a stepping motor which has a limit speed for losing steps, since there is a limitation of the usable speed, there may be a case where the set moving amount cannot be driven within the predetermined time.

Figure 15:
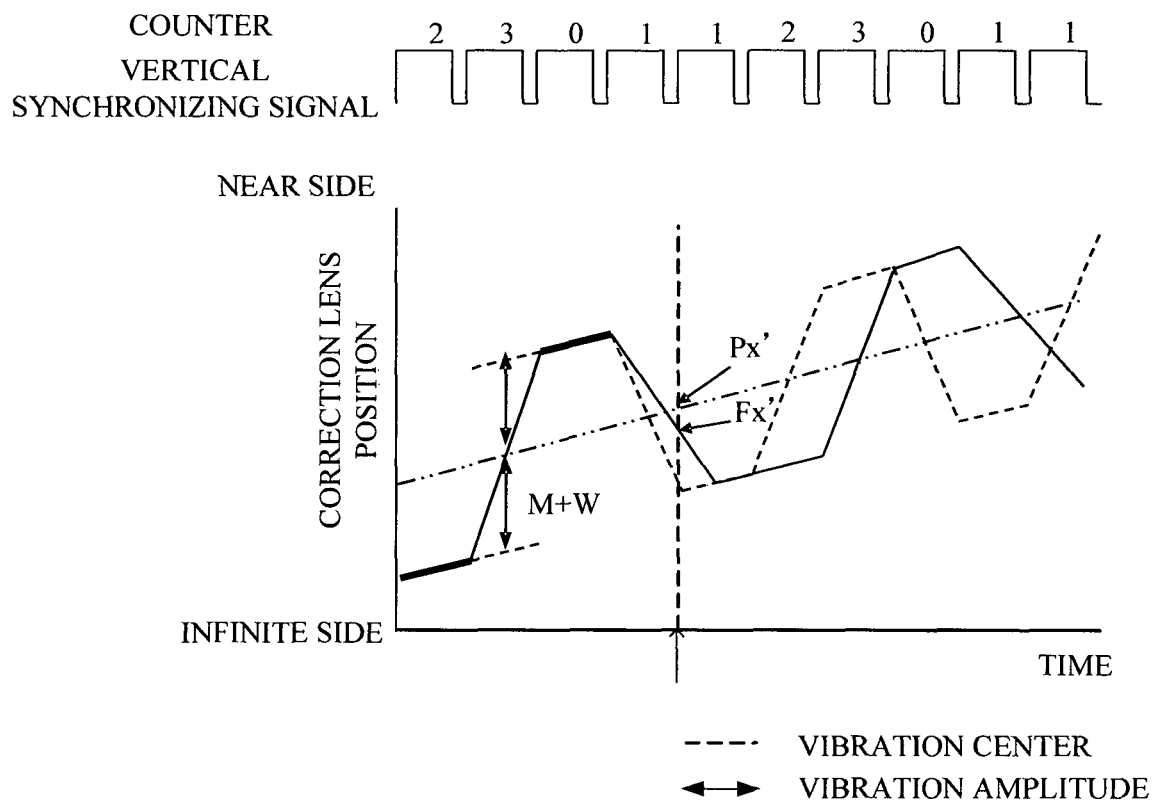
FIG. 15 is a diagram of illustrating a case in which a modulation operation step is maintained in Embodiment 1.

In this case, the camera microcomputer C106, as illustrated in FIG. 15, controls the moving timing of the correction lens L105 so that the modulation operation step is maintained to be the same (so that the step does not proceed) until the correction lens L105 moves to the target position. Then, this moving timing is sent to the lens microcomputer L106 as the modulation AF control information. Thus, switching phases of the moving direction (the vibrating direction) of the correction lens L105 and the moving direction (the modulating direction) of the vibration center in the modulation AF control are not shifted from each other.

FIG. 15 illustrates an example of a case where the drive speed is limited in driving the correction lens L105 up to the position of symbol a) in FIG. 13 and therefore the driving can be performed only by the vibration amplitude obtained by removing the movement of the vibration center in the one vertical synchronizing time (a case where the modulation operation step is maintained). When the drive speed of the correction lens L105 is slow, as illustrated in the drawing, the moving amount of the correction lens L105 that moves in the one vertical synchronizing time is small with respect to a target moving amount (indicated by a dashed line in the drawing). Therefore, continuing the same modulation operation step in one more vertical synchronizing time, the correction lens L105 reaches the position of symbol a).

In order to perform such a control, in Step C606, the camera microcomputer C106 receives the correction lens target position reaching information from the lens microcomputer L106, and then determines whether it is impossible for the correction lens L105 to reach the target position. When it is impossible for the correction lens L105 to reach the target position, the camera microcomputer C106 maintains the modulation operation step counter, and the processing is finished. On the other hand, when it is possible for the correction lens L105 to reach the target position, the flow proceeds to Step C607. Then, the camera microcomputer C106 sets the modulation operation step counter to 0, i.e. clears the modulation operation step counter, when the modulation operation step counter is 3. When this counter indicates another value, the camera microcomputer C106 adds 1 to the modulation operation step counter. Then, the processing is finished.

The lens microcomputer L106, in Step L618, generates a drive signal based on the target position and the drive speed calculated by the past processing and outputs the drive signal to the correction lens actuator L108 so as to drive the correction lens L105.

In the present embodiment, the vibration amplitude M and the center moving amount W are set in Step L607 and they are overlapped with the zoom tracking control in Step L610 so as to perform the cam specifying control during the zoom operation. However, during varying the magnification from the telephoto direction to the wide-angle direction, the in-focus state can be maintained to some extent even when the modulation operation is not performed since the interval between the plurality of zoom tracking cams is wide at the telephoto side as described above. Therefore, during the zoom operation from the telephoto direction to the wide-angle direction, the vibration amplitude M and the center moving amount W may be set to 0 so as to only perform the tracking control of the reference cam.

Thus, in the present embodiment, the camera body C100 generates the modulation AF control information based on the focus signal. In addition, the interchangeable lens L100 overlaps the movement (the vibration) of the correction lens L105 by the modulation AF control using the modulation AF control information obtained from the camera body C100 with the movement of the correction lens L105 by the zoom tracking control. In other words, the camera microcomputer C106 sends control information generated in accordance with the output of the magnification varying lens position sensor L107 to the lens microcomputer L106, and then makes the lens microcomputer L106 to perform the zoom tracking control by overlapping the vibration control using this control information. Furthermore, the lens microcomputer L106 performs the zoom tracking control using the control information generated in accordance with the output of the magnification varying lens position sensor L107.

In addition, in the present embodiment, the lens microcomputer L106 receives the in-focus degree information from the camera microcomputer C106, and sets the center moving amount or the vibration amplitude to be larger as the in-focus degree is low, i.e. the center moving amount or the vibration amplitude is reduced as the in-focus degree is high. As a result, when the in-focus degree is reduced, i.e. the blur is increased, during varying the magnification, the zoom tracking cam that is to be followed can be quickly specified by increasing the center moving amount or the vibration amplitude to be able to obtain the in-focus state. When the in-focus degree is high during varying the magnification, the zoom tracking cam can be continuously traced without generating the blur by decreasing the center moving amount or the vibration amplitude.

In the present embodiment, the case where the in-focus degree is obtained using Expression (8) is described, but as described above, the in-focus degree information does not have to be a value obtained by Expression (8) and any information may also be adopted if it is information related to the in-focus degree. For example, the integrated evaluation value described above may also be adopted as the in-focus degree information.

In the present embodiment, the two threshold values ($\alpha$, $\beta$) are used to classifying the high or low of the in-focus degree, but one threshold value or three or more threshold values may also be adopted. As the number of the threshold values is larger, the vibration amplitude or the center moving amount depending on the in-focus degree can be set more finely.

Thus, according to the present embodiment, in the combination of each of various kinds of lens units and the camera body, the zoom tracking cam to be followed can be precisely specified during the zoom operation, and a good zoom tracking control in which the response and the stability are improved can be performed.

EXAMPLE 2

Next, referring to FIG. 16, Embodiment 2 (Example 2) of the present invention will be described. In Embodiment 1, the case where the manual zoom in which the magnification varying lens L102 is mechanically driven via the cam ring by the rotational operation of the operating member such as a ring is described. On the other hand, in the present embodiment, a case where a power zoom is performed by the operating member such as a seesaw key will be described.

Figure 16:
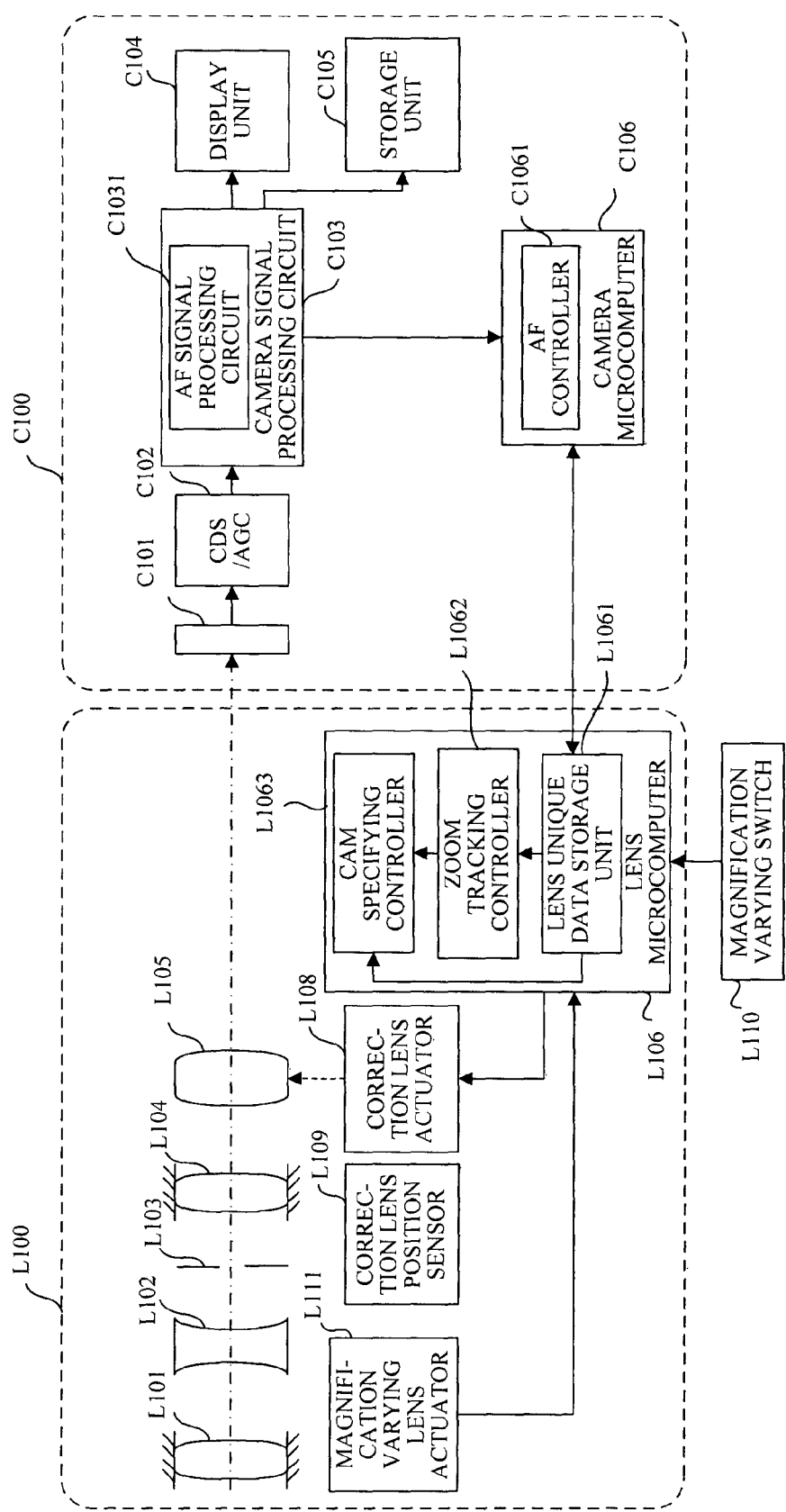
FIG. 16 is a block diagram of illustrating a configuration of a camera system with an interchangeable lens in Embodiment 2.

FIG. 16 is a block diagram of illustrating a configuration of a camera system with an interchangeable lens in the present embodiment. The lens unit L100 includes a magnification varying switch L110 and a magnification varying lens actuator L111 in addition to the configuration illustrated in FIG. 1. The magnification varying switch L110 instructs the magnification varying operation for the lens microcomputer L106 in accordance with its operation. The magnification varying lens actuator L111 moves the magnification varying lens L102 by the drive based on the drive signal from the lens microcomputer L106 that receives the instruction of the zooming. The lens microcomputer L106 as a magnification varying operation detector detects the magnification varying operation based on the output of the magnification varying switch L110. The other configurations are the same as those of Embodiment 1, the same numerals as those of Embodiment 1 are added to the common configurations The magnification varying switch L110 may be a switch such as a seesaw switch or may be an electronic ring that has a function of converting a rotation amount or a rotation speed of the operating member that is to be rotatably operable into an electric signal. The magnification varying switch may also be provided on the camera body C100 so as to send the zoom instruction to the lens microcomputer L106 via the camera microcomputer C106.

The magnification varying lens actuator L111 is configured by a stepping motor, a DC motor, a vibration motor, a voice coil motor, or the like. In the present embodiment, the position of the magnification varying lens is controlled by the driving amount of the magnification varying lens actuator L111 after the magnification varying lens L102 is detected to be located at a reference position based on an output of a reset sensor or the like (not shown). Similarly to Embodiment 1, a position sensor that detects the position of the magnification varying lens L102 may be provided as well.

The zoom tracking cam specifying control in the present embodiment is basically the same as that of Embodiment 1. However, the determination as to whether the lens is in the zoom operation in Step L602 and Step L608 of FIGS. 6A and 6B respectively is performed based on the output of the magnification varying switch L110 in the present embodiment, which is different from Embodiment 1 where the determination is performed based on the output of the magnification varying lens position sensor L107. When the magnification varying lens is provided on the camera body C100, the lens microcomputer L106 does not have to send the zoom information to the camera microcomputer C106 in Step L606. In Step C1101 of FIG. 11, the lens microcomputer L106 performs the determination based on the zoom instruction detected by the camera microcomputer C106, and performs the processing of Step C1102 to Step C1104, and may send the zoom corresponding information along with the zoom instruction to the lens microcomputer L106.

Furthermore, in the present embodiment, a method of setting a moving speed Zsp of the magnification varying lens L102 in Step L701 of FIG. 7 is different from the method of Embodiment 1. In other words, in Step L701, the moving speed Zsp of the magnification varying lens is set based on the moving amount of the magnification varying lens actuator L111 per unit time.

Also in the present embodiment, similarly to Embodiment 1, the camera body C100 generates the modulation AF control information based on the focus signal. On the other hand, the interchangeable lens L100 overlaps the movement (the vibration) of the correction lens L105 by the modulation AF control using the modulation AF control information obtained from the camera body C100 with the movement of the correction lens L105 by the zoom tracking control. As a result, according to the present embodiment, in the combination of each of various kinds of lens units and the camera body C100, the zoom tracking cam to be followed can be precisely specified during the zoom operation, and a good zoom tracking control in which the response and the stability are improved can be performed.

EXAMPLE 3

In Embodiment 1, the camera microcomputer C106 classifies the high or low of the in-focus degree and generates the in-focus degree label indicating the high or low. Then, it communicates this in-focus degree label as the in-focus degree information to the lens microcomputer L106, and the lens microcomputer L106 determines the center moving mount and the vibration amplitude in accordance with the in-focus degree label.

On the other hand, in the present embodiment, the camera microcomputer C106 calculates the in-focus degree itself as the in-focus degree information to be sent to the lens microcomputer L106, and the lens microcomputer L106 determines the center moving amount and the vibration amplitude in accordance with the in-focus degree. In this case, the lens microcomputer L106 classifies the high or low of the in-focus degree based on a threshold value.

The configuration of the camera system with the interchangeable lens of the present embodiment is the same as that described in Embodiment 1 (FIG. 1). The control during varying the magnification such as the modulation AF control described with reference to FIGS. 2 to 5, and 7 to 15 in Embodiment 1 is the same as that of Embodiment 1.

In the present embodiment, in Step C605 of FIG. 6A, the camera microcomputer C106 sends the in-focus degree calculated using Expression (8) described above to the lens microcomputer L106.

Figure 21:
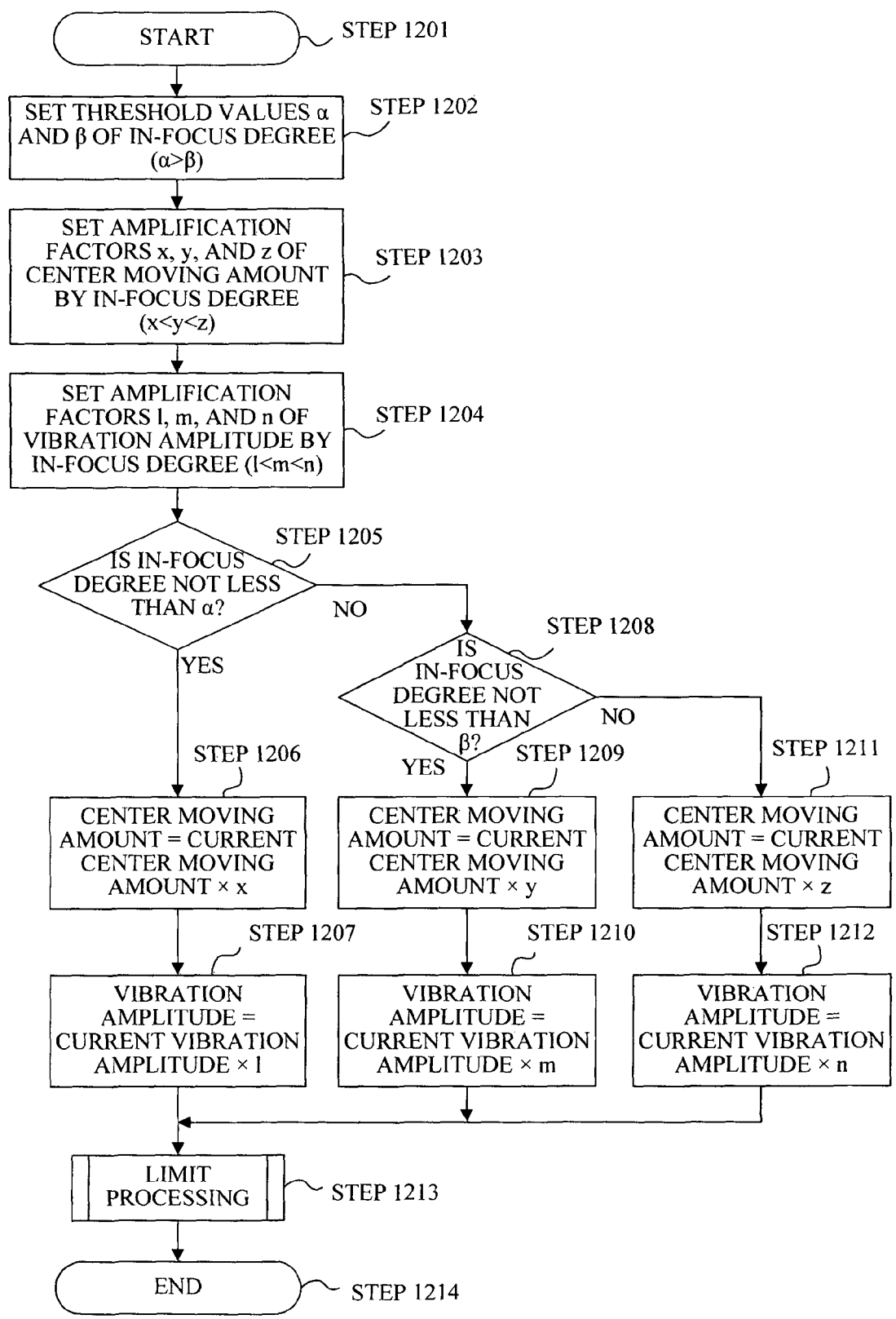
FIG. 21 is a flowchart of illustrating a processing of setting a modulation control amount in accordance with the in-focus degree information in Embodiment 3.

In Step L607 of FIG. 6A, a method of changing the vibration amplitude and the center moving amount in accordance with the in-focus degree by the lens microcomputer L106 will be described with reference to a flowchart of FIG. 21.

When the processing starts in Step 1201, the lens microcomputer L106 sets the threshold values $\alpha$ and $\beta$ ($\alpha > \beta$) relating to the in-focus degree in Step 1202. The high, medium, and low of the in-focus degree are classified at the boundary of these threshold values $\alpha$ and $\beta$, and the vibration amplitude and the center moving amount which are suitable for the in-focus degree are set. A state where the in-focus degree is a high state in which the in-focus degree is not less than the threshold value $\alpha$ is in an in-focus state or a state near the in-focus state. A state where the in-focus degree is a medium state in which the in-focus degree is less than the threshold value $\alpha$ and is not less than the threshold value $\beta$ is in a state where the image is slightly blurred. A state where the in-focus degree is a low state in which the in-focus degree is less than the threshold value $\beta$ is in a state where the image is significantly blurred.

Next, in Step 1203, the lens microcomputer L106 sets an amplification factors (gains) x, y, and z (x<y<z) of the center moving amount for the cases where the in-focus degrees are high, middle, and low, respectively.

Next, in Step 1204, the lens microcomputer L106 sets the amplification factors (the gains) l, m, n (l<m<n) of the vibration amplitude for the cases where the in-focus degrees are high, medium, and low, respectively. Thus, in the present embodiment, the amplification factors of the vibration amplitude and the center moving amount are set to be smaller as the in-focus degree is high, in other words, the amplification factors of the vibration amplitude and the center moving amount are set to be larger as the in-focus degree is low.

In Step 1205, the lens microcomputer L106 determines whether the current in-focus degree is not less than the threshold value $\alpha$, and then the flow proceeds to Step 1206 when the current in-focus degree is not less than the threshold value $\alpha$, and on the other hand, the flow proceeds to Step 1208 when it is less than the threshold value $\alpha$.

In Step 1206, the lens microcomputer L106 multiplies the amplification factor x by the currently set center moving amount to obtain a new center moving amount. In addition, in Step 1207, the lens microcomputer L106 multiplies the amplification factor l by the currently set vibration amplitude to obtain new vibration amplitude. Thus, when the in-focus degree is not less than the threshold value $\alpha$ and the state is the in-focus state or near the in-focus state, the new center moving amount and vibration amplitude are set by multiplying the minimum amplification factors x and l by the current center moving amount and vibration amplitude.

In Step 1208, the lens microcomputer L106 determines whether the current in-focus degree is not less than the threshold value $\beta$, and then the flow proceeds to Step 1209 when the in-focus degree is not less than $\beta$, and on the other hand, the flow proceeds to Step 1211 when it is less than $\beta$.

In Step 1209, the lens microcomputer L106 multiplies the amplification factor y by the currently set center moving amount to obtain a new center moving amount. In addition, in Step 1210, the lens microcomputer L106 multiplies the amplification factor m by the currently set vibration amplitude to obtain new vibration amplitude. Thus, in the state where the in-focus degree is less than the threshold value $\alpha$ and is not less than the threshold value $\beta$ where the image is slightly blurred, the new center moving amount and vibration amplitude are set by multiplying the amplification factors y and m which are rather large (larger than x and l) by the current center moving amount and vibration amplitude.

In Step 1211, since the lens microcomputer L106 determines that the current in-focus degree is less than the threshold value $\beta$, it multiplies the amplification factor z by the currently set center moving amount so as to obtain a new center moving amount. In addition, in Step 1212, the lens microcomputer L106 multiplies the amplification factor n by the currently set vibration amplitude so as to obtain new vibration amplitude. Thus, in the state where the in-focus degree is less than the threshold value β where the image is significantly blurred, the new center moving amount and vibration amplitude are set by multiplying the amplification factors z and n which are large (larger than y and m) by the current center moving amount and vibration amplitude.

Thus, the lens microcomputer L106 that has set the center moving amount and the vibration amplitude depending on the in-focus degree performs a limit processing in Step 1213. Then, in Step 1214, the processing is finished. The limit processing is similar to that described above with reference to FIG. 20.

The threshold values α and β for the in-focus degree can be arbitrarily set if the in-focus degree can be classified as high, medium, or low. For example, the threshold value α and β can be set to 60 and 30, respectively. Also with respect to the amplification factors x, y, and z of the center moving amount, arbitrary values can be set if values of them are larger as the in-focus degree is lowered. For example, the amplification factors x, y, and z may be set to 1, 1.4, and 1.8, respectively (x=1, y=1.4, z=1.8). In addition, with respect to the amplification factors l, m, and n of the vibration amplitude, arbitrary values can be set if values of them are larger as the in-focus degree is lowered. For example, the amplification factors l, m, and n may be set to 1, 1.2, and 1.4, respectively (l=1, m=1.2, n=1.4).

As the blur of the image is larger, the variation of the blur caused by the minute vibration and the center movement of the correction lens L105 is unnoticeable. Therefore, the amplification factor may be set to a value where the change of the blur caused by the minute vibration and the center movement can be permitted in the focus state that each in-focus degree indicates.

The amplification factors of the center moving amount and the vibration amplitude do not need to be changed for the in-focus degrees different from each other. In other words, two of the three amplification factors (x, y, z) or (l, m, n) depending on the in-focus degree may also be set to be equal to each other. For example, when the processing in which the vibration amplitude is changed only if a large amount of blurring is generated, as the amplification factor of the vibration amplitude, for example values of l=1, m=1, and n=1.5 may be set.

Thus, in the present embodiment, the vibration amplitude and the center moving amount are set to be large when the in-focus degree is low, and on the other hand, the vibration amplitude and the center moving amount are set to be suppressed when the in-focus degree is high. As a result, even when the image is blurred by the change of the object (the change of the object distance) or the like by the camera work during varying the magnification, the in-focus cam can be quickly specified. When the in-focus cam is traced in the in-focus state, the vibration amplitude and the center moving amount are set to be suppressed to be able to prevent the transfer to a wrong zoom tracking cam and perform a stable zoom tracking control.

According to each of the embodiments described above, an image pickup apparatus generates control information that is used for a vibration control and then sends the control information to a lens unit, and therefore the lens unit performs a zoom tracking control in which the vibration control using this control information is overlapped. As a result, even when each of various kinds of lens units is mounted on the image pickup apparatus, a good zoom tracking control in which a response and a stability are improved can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-004545, filed on Jan. 13, 2012, No. 2012-004765, filed on Jan. 13, 2012, and No. 2012-127066, filed on Jun. 4, 2012, which are hereby incorporated by reference herein in their entirety.

INDUSTRIAL APPLICABILITY

An image pickup apparatus that is capable of performing a good zoom tracking control for each of various kinds of interchangeable lenses can be provided.

REFERENCE SIGNS LIST

C100 CAMERA BODY
C101 IMAGE PICKUP ELEMENT
C106 CAMERA MICROCOMPUTER
L100 LENS UNIT
L105 CORRECTION LENS
L106 LENS MICROCOMPUTER

The invention claimed is:

1. A lens unit capable of being removably mounted on an image pickup apparatus including an image pickup element configured to perform photoelectric conversion of an object image formed by an image pickup optical system, a focus signal generator configured to generate a focus signal indicating a focus state of the image pickup optical system using an output from the image pickup element, and an image pickup apparatus controller configured to generate control information used for a vibration control that vibrates a correction lens and also moves a vibration center of the correction lens in a direction where the focus signal increases, the lens unit comprising:
   the image pickup optical system including a magnification varying lens configured to perform a magnification varying operation and the correction lens configured to correct an image plane variation caused by a movement of the magnification varying lens;
   a storage unit storing first information that indicates a relation between a position of the magnification varying lens and a position of the correction lens for each object distance; and
   a lens controller configured to control a communication with the image pickup apparatus and perform a predetermined control in which the correction lens moves in accordance with the movement of the magnification varying lens based on the first information,
   wherein the lens controller sends information relating to the magnification varying operation to the image pickup apparatus, and overlaps the vibration control of the correction lens based on the control information generated by the image pickup apparatus in accordance with the information relating to the magnification varying operation with the predetermined control,
   wherein the control information contains third information that indicates whether the control information corresponds to the information relating to the magnification varying operation, and
   wherein the lens controller moves the correction lens by overlapping the vibration control with the predetermined control when the third information corresponds to the information relating to the magnification varying operation, and moves the correction lens without overlapping the vibration control with the predetermined control when the third information does not correspond to the magnification varying operation.

2. The lens unit according to claim 1, wherein the information relating to the magnification varying operation is information indicating whether the magnification varying lens performs the magnification varying operation.

3. The lens unit according to claim 1, wherein the control information contains second information relating to a moving amount of the correction lens in the vibration control, and
wherein the lens controller sets the moving amount of the correction lens in the vibration control based on the second information.

4. The lens unit according to claim 1, wherein the lens controller performs the vibration control of the correction lens using the control information when the magnification varying lens does not perform the magnification varying operation.

5. The lens unit according to claim 1, wherein the control information contains information relating to an in-focus degree of an object based on the output from the image pickup element, and
wherein the lens controller sets a moving amount of the correction lens based on the information relating to the in-focus degree.

6. The lens unit according to claim 5, wherein the control information contains third information that indicates whether the control information corresponds to the information relating to the magnification varying operation, and
wherein the third information further contains the information relating to the in-focus degree when the third information corresponds to the information relating to the magnification varying operation.

7. The lens unit according to claim 1, wherein the control information contains information relating to a predetermined time, and
wherein the lens controller sends information that indicates whether the set moving amount of the correction lens can be moved within the predetermined time to the image pickup apparatus.

8. The lens unit according to claim 1, wherein the lens controller receives information of a permissible circle of confusion of the image pickup element from the image pickup apparatus, and sets a moving amount of the correction lens based on information of the permissible circle of confusion.

9. The lens unit according to claim 1, further comprising a position sensor configured to detect a position of the magnification varying lens,
wherein the lens controller detects the magnification varying operation based on a change of an output of the position sensor.

10. The lens unit according to claim 1, further comprising a switching member configured to instruct the magnification varying operation,
wherein the lens controller detects the magnification varying operation based on an output of the switching member.

11. The lens unit according to claim 1, further comprising:
a ring member configured to rotate around an optical axis of the image pickup optical system; and
a rotation amount detector configured to detect a change amount caused by a rotation of the ring member,
wherein the lens controller detects the magnification varying operation based on a change of an output of the rotation amount detector.

12. An image pickup apparatus on which a lens unit is capable of being removably mounted, the lens unit including an image pickup optical system including a magnification varying lens configured to perform a magnification varying operation and a correction lens configured to correct an image plane variation caused by a movement of the magnification varying lens, a storage unit storing first information that indicates a relation between a position of the magnification varying lens and a position of the correction lens for each object distance, and a lens controller configured to perform a predetermined control in which the correction lens moves in accordance with the movement of the magnification varying lens based on the first information, the image pickup apparatus comprising;
an image pickup element configured to perform photoelectric conversion of an object image formed by the image pickup optical system;
a focus signal generator configured to generate a focus signal indicating a focus state of the image pickup optical system using an output from the image pickup element; and
an image pickup apparatus controller configured to control a communication with the lens unit and generate control information used for a vibration control that vibrates the correction lens and also moves a vibration center of the correction lens in a direction where the focus signal increases,
wherein the image pickup apparatus controller receives information relating to the magnification varying operation, generates the control information in accordance with the information relating to the magnification varying operation, and sends the control information to the lens unit,
wherein the control information contains information that instructs the lens controller to perform a first movement in which a movement in the direction where the predetermined control and a second movement in which a relative position relation between a position of the correction lens and the vibration center after the first movement is maintained as a way of a movement of the correction lens in the vibration control,
wherein the control information contains information relating to a predetermined time, and
wherein the image pickup apparatus controller limits the second movement and sends the control information to continue the first movement to the lens unit when receiving information indicating that the correction lens cannot move by a moving amount set based on the control information within the predetermined time.

13. The image pickup apparatus according to claim 12, wherein the information relating to the magnification varying operation is information indicating whether the magnification varying lens performs the magnification varying operation.

14. The image pickup apparatus according to claim 12, wherein the control information contains second information relating to a moving amount of the correction lens in the vibration control.

15. The image pickup apparatus according to claim 12, wherein the control information contains third information that indicates whether the control information corresponds to the information relating to the magnification varying operation.

16. The image pickup apparatus according to claim 12, wherein the control information contains information relating to an in-focus degree of an object based on the output from the image pickup element.

17. The image pickup apparatus according to claim 16, wherein the control information contains third information that indicates whether the control information corresponds to the information relating to the magnification varying operation, and wherein the third information further contains the information relating to the in-focus degree when the third information corresponds to the information relating to the magnification varying operation.

18. The image pickup apparatus according to claim 12, wherein the image pickup apparatus controller sends a moving timing of the correction lens as the control information to the lens unit so that switching phases of a vibrating direction of the correction lens and a moving direction of the vibration center in the vibration control are not shifted from each other.

19. The image pickup apparatus according to claim 12, wherein the image pickup apparatus controller sends information of a permissible circle of confusion of the image pickup element to the lens controller.

20. A method of controlling a lens unit, the lens unit including an image pickup optical system including a magnification varying lens and a correction lens and configured to be removably mounted on an image pickup apparatus that includes an image pickup element configured to perform photoelectric conversion of an object image formed by an image pickup optical system, generates a focus signal indicating a focus state of the image pickup optical system using an output from the image pickup element, and generates control information used for vibration control, the method comprising the steps of:

performing a magnification varying operation with the magnification varying lens;

correcting an image plane variation caused by movement of the magnification varying lens with the correction lens;

performing a predetermined control in which the correction lens moves in accordance with the movement of the magnification varying lens based on first information that indicates a relation between a position of the magnification varying lens and a position of the correction lens for each object distance;

vibrating the correction lens and moving a vibration center of the correction lens in a direction where the focus signal increases according to the control information;

sending information relating to the magnification varying operation to the image pickup apparatus;

receiving the control information generated in accordance with the information relating to the magnification varying operation from the image pickup apparatus, wherein the control information contains third information that indicates whether the control information corresponds to the information relating to the magnification varying operation;

overlapping the vibration control of the correction lens based on the control information with the predetermined control; and moving the correction lens by overlapping the vibration control with the predetermined control when the third information corresponds to the information relating to the magnification varying operation, and moving the correction lens without overlapping the vibration control with the predetermined control when the third information does not correspond to the magnification varying operation.

21. A method of controlling an image pickup apparatus, the image pickup apparatus on which a lens unit is capable of being removably mounted, the lens unit including an image pickup optical system including a magnification varying lens configured to perform a magnification varying operation and a correction lens configured to correct an image plane variation caused by a movement of the magnification varying lens and configured to perform a predetermined control in which the correction lens moves in accordance with the movement of the magnification varying lens based on first information that indicates a relation between a position of the magnification varying lens and a position of the correction lens for each object distance, the method comprising the steps of:

generating a focus signal indicating a focus state of the image pickup optical system using an output from an image pickup element that performs photoelectric conversion of an object image formed by the image pickup optical system;

receiving information relating to the magnification varying operation from the lens unit;

generating control information used for vibration control that vibrates the correction lens and also moves a vibration center of the correction lens in a direction where the focus signal increases in accordance with the information relating to the magnification varying operation wherein the control information contains information that instructs the correction lens to perform a first movement in which a movement in the direction where the focus signal increases is overlapped with the correction lens moved by the predetermined control and a second movement in which a relative position relation between a position of the correction lens and the vibration center after the first movement is maintained as a was of a movement of the correction lens in the vibration control, and wherein the control information contains information relating to a predetermined time;

sending the generated control information to the lens unit, and limiting the second movement and sending the control information to continue the first movement to the lens unit when receiving information indicating that the correction lens cannot move by moving amount set based on the control information within the predetermined time.

\* \* \* \* \*